Feb. 27, 1968  C. D. DONLEY ET AL  3,370,493
APPARATUS FOR FEEDING WORK TO AND FROM A WORK STATION
Filed Oct. 23, 1965  11 Sheets-Sheet 9

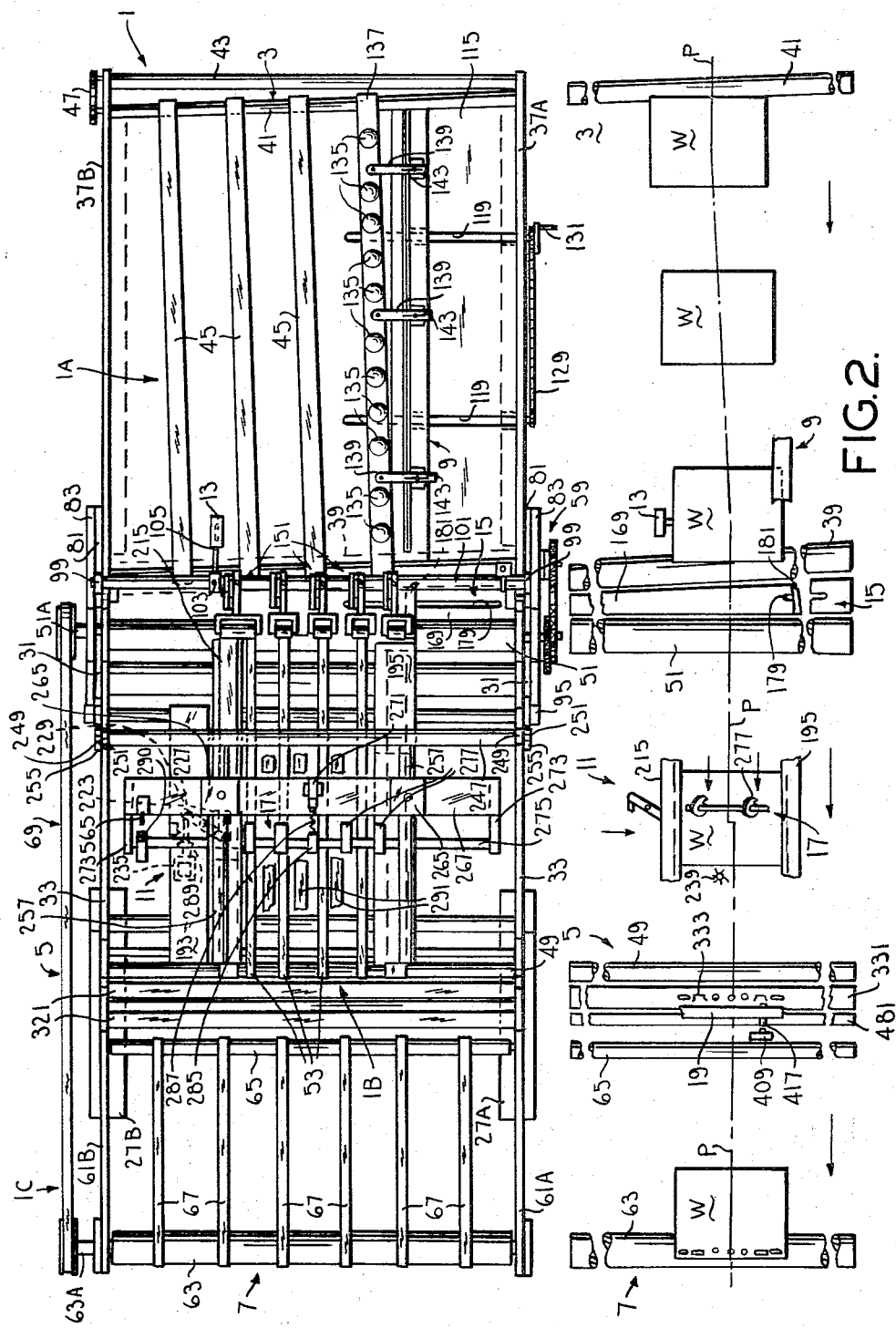

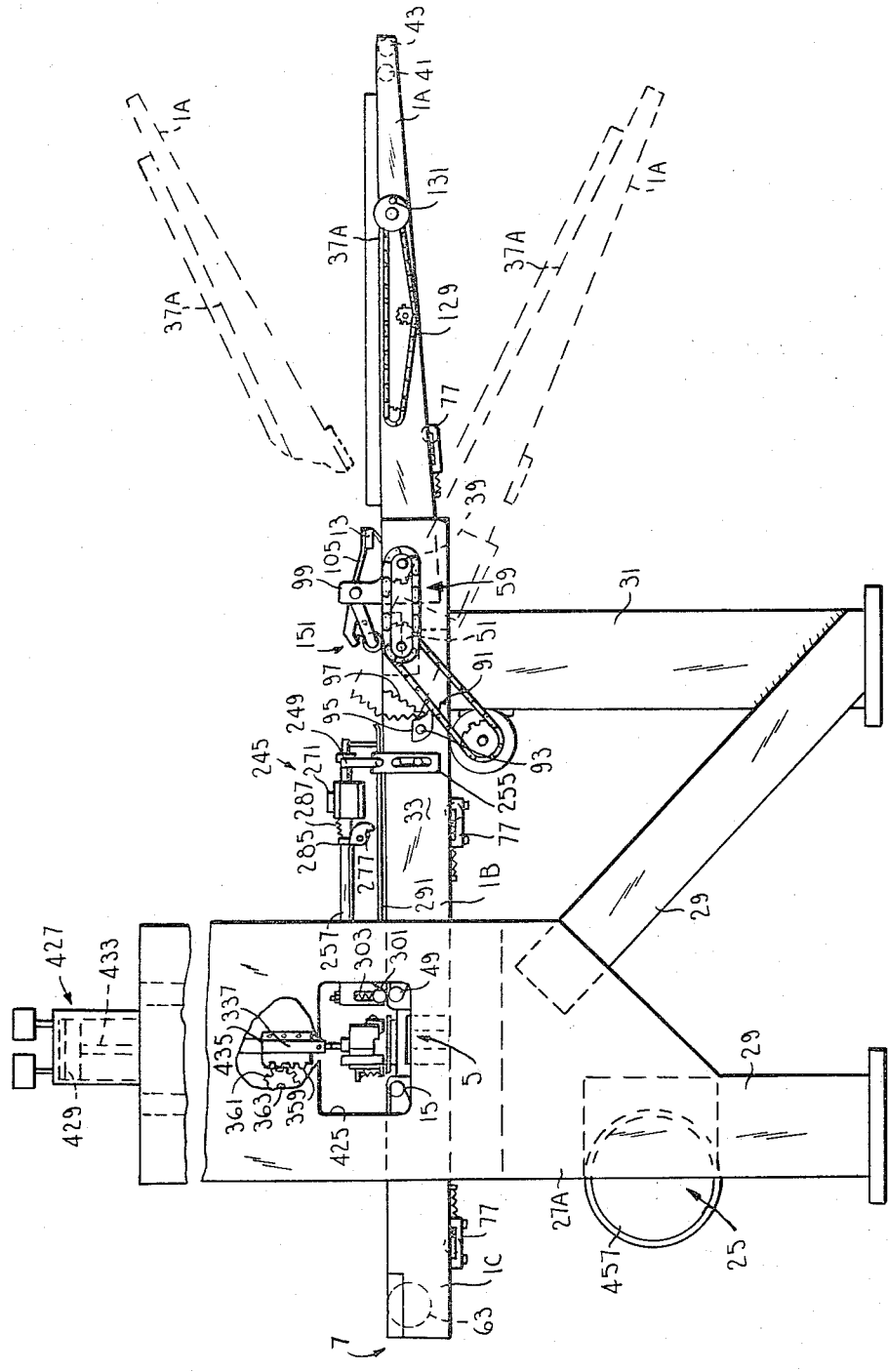

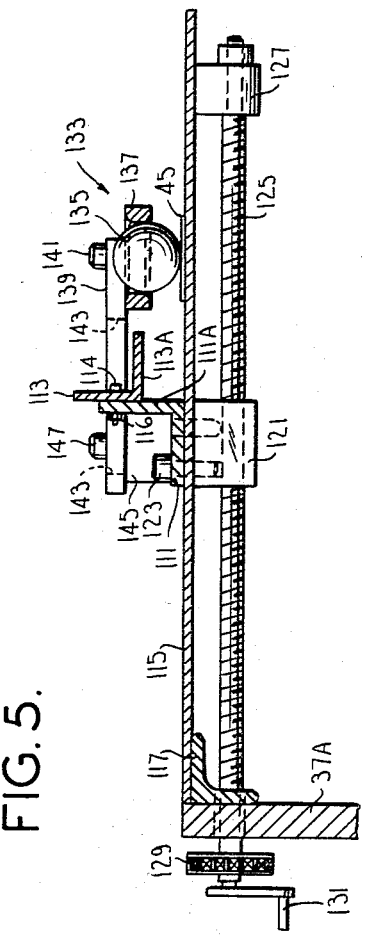
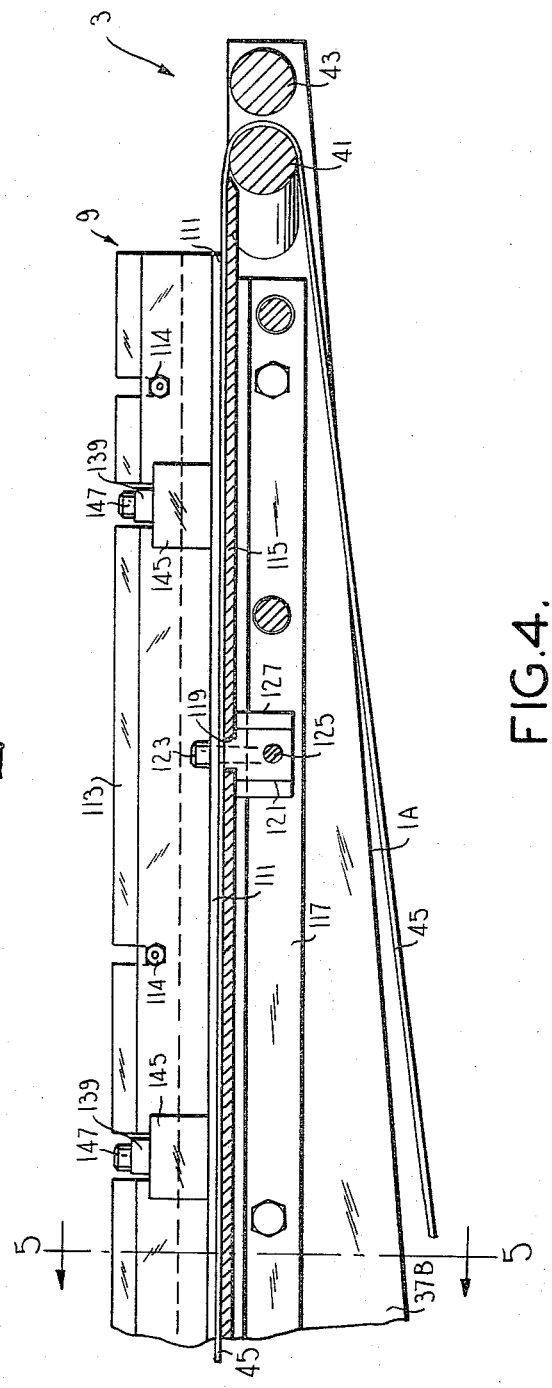
FIG. 5.
FIG. 4.

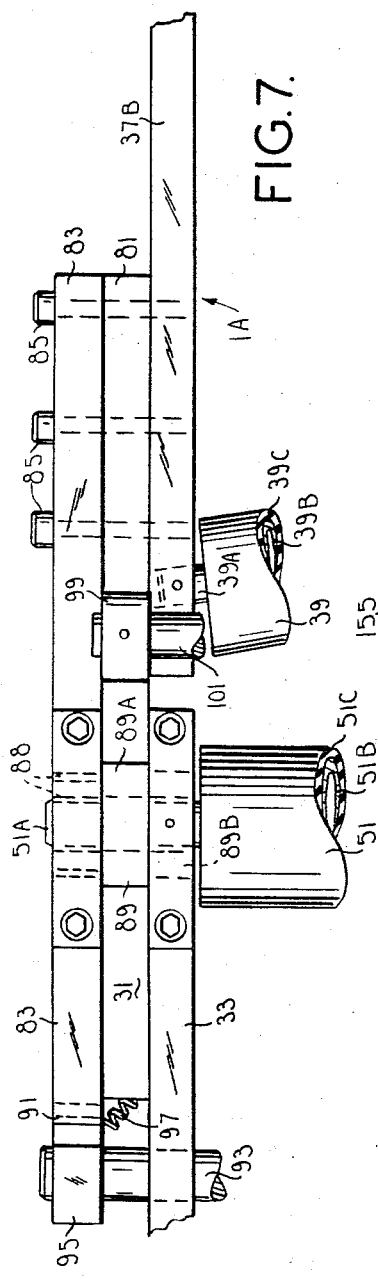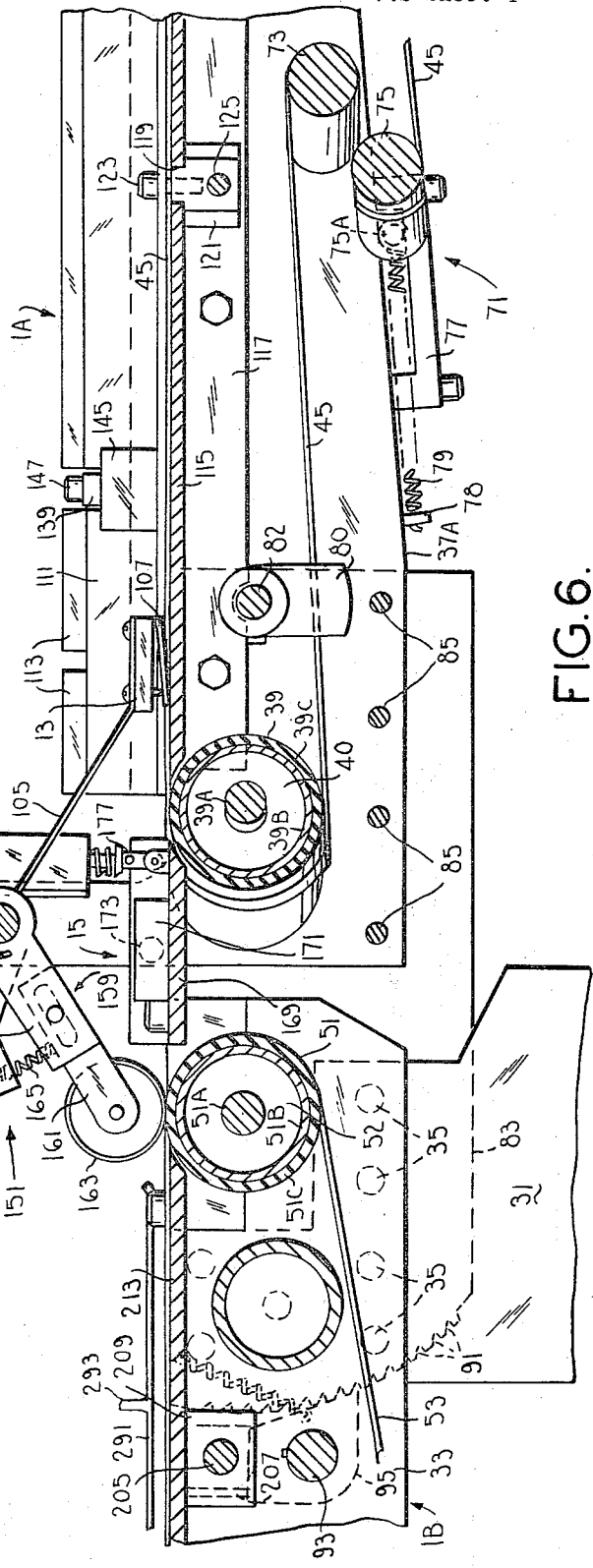

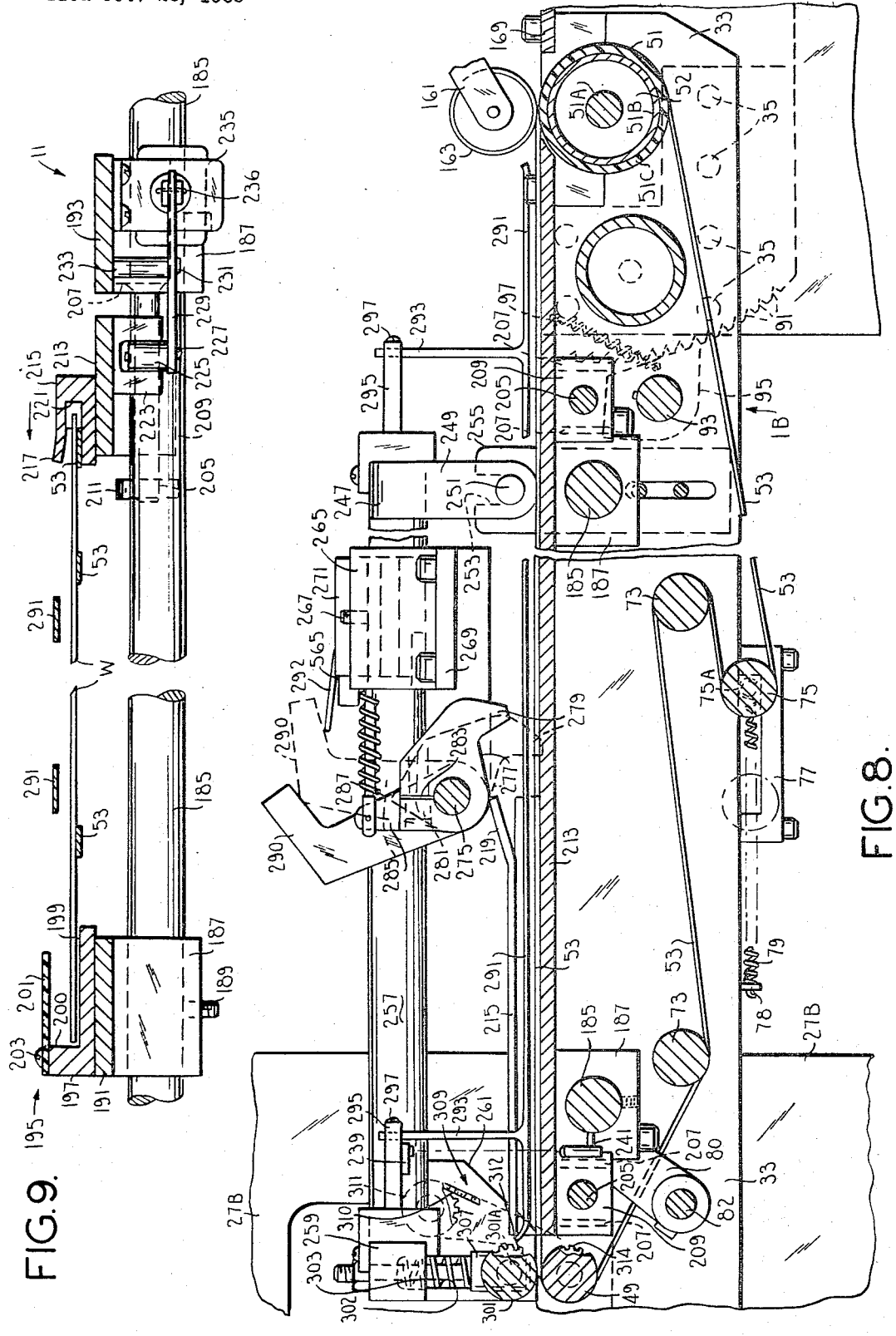

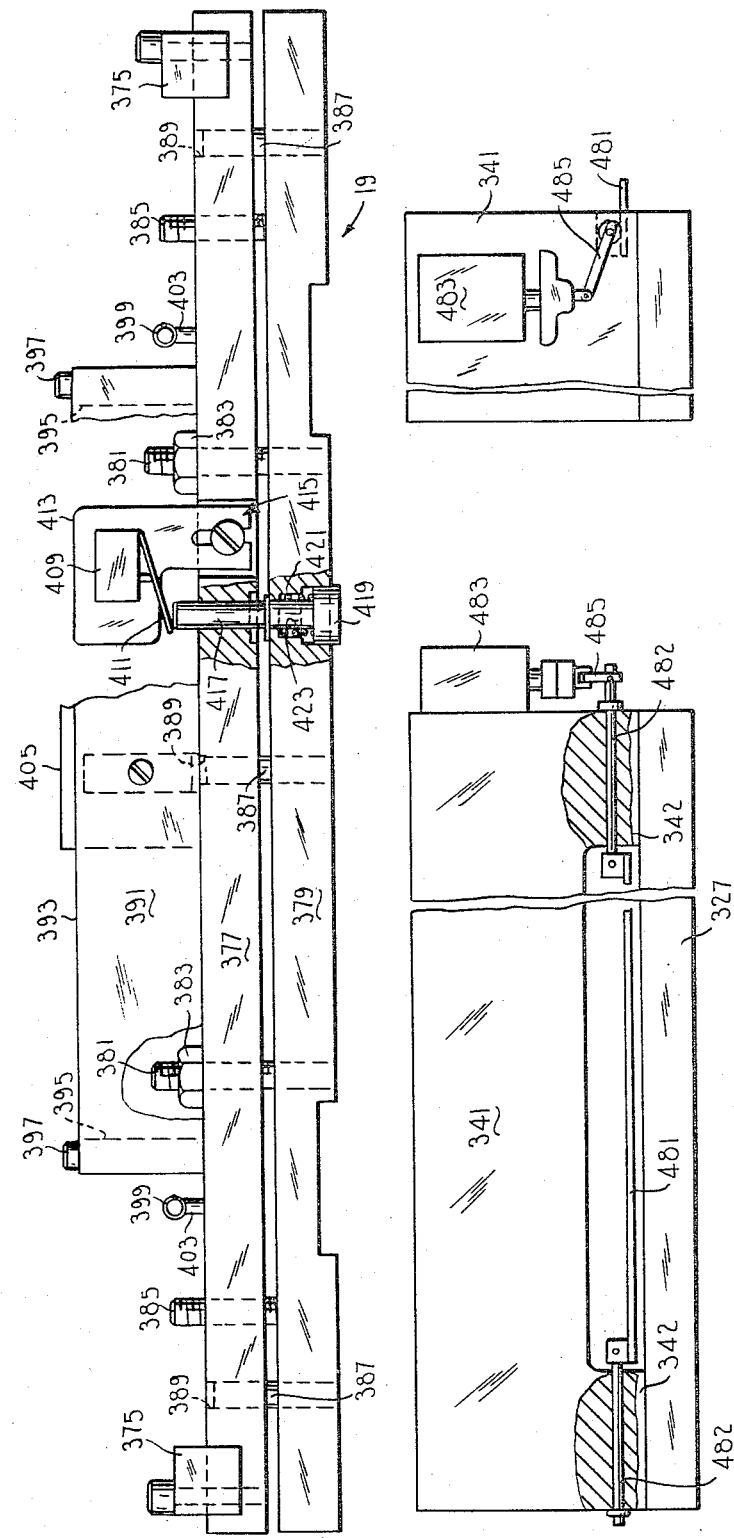

Feb. 27, 1968     C. D. DONLEY ET AL     3,370,493

APPARATUS FOR FEEDING WORK TO AND FROM A WORK STATION

Filed Oct. 23, 1965     11 Sheets-Sheet 10

Feb. 27, 1968

APPARATUS FOR FEEDING WORK TO AND FROM A WORK STATION

Filed Oct. 23, 1965

United States Patent Office 3,370,493
Patented Feb. 27, 1968

3,370,493
APPARATUS FOR FEEDING WORK TO AND
FROM A WORK STATION
Charles Don Donley, Don Donley, Jr., Dean Donley, and Dexter L. Rieger, Freeburg, Ill., assignors, by mesne assignments, to Donley Bindery Company, Inc., Freeburg, Ill., a corporation of Missouri
Filed Oct. 23, 1965, Ser. No. 503,836
25 Claims. (Cl. 83—155)

ABSTRACT OF THE DISCLOSURE

Pieces of paper or other work is carried by a conveyor system from an entrance of apparatus to a work station and then to the exit of the apparatus. As the work travels along the conveyor system its sides are properly located relative to the entrance of the work station and the trailing edge of the work is engaged for moving the work into the work station. A gate at the work station moves between elevated and lowered positions and when in the lowered position it is engageable by the work entering the work station for stopping the work at the desired position. The work is punched in the work station and then the gate is raised and the conveyor system removes the work from the work station and moves it to the exit of the apparatus. Work that is so misaligned on the conveyor system that it cannot enter the work station is detected and removed. If the punch fails to operate within a predetermined time interval after the work is delivered to the work station, then the gate is raised and work is removed from the apparatus along a path different from that of the punched work.

---

The apparatus and method of this invention are particularly useful in (but not limited to) the printing or bindery arts where efficient, profitable operation requires high volume production at a maximum rate and with minimum labor costs. In spite of these requirements, many necessary operations are still principally manually performed, or at least performed on machinery requiring a full time operator for one or more of the steps of picking up the work, squaring it, properly positioning the work in machinery, then initiating operation of the machinery, and finally removing the work from the machinery and stacking it on a receiver for finished work. The need for manually performing one or more of these steps seriously limits maximum production rates, effects uniform quality and raises labor costs.

A specific example of a time consuming process in the bindery field which is normally at least partially carried out by manual operations is the punching of holes in printed work. This process requires the work to be picked up, squared, accurately located in a punch machine with both sides and ends properly aligned, then punched by the punch machine, removed from the punch machine and stacked. The need to manually perform any of these steps limits the quantity of work that can be punched in a specific time, and the quality of the finished product is directly dependent on the skill of the individual worker. Since bindery work is frequently done at very low profit margins, there is a need for an apparatus and method for carrying out the punching operations automatically and at a high rate of speed.

Accordingly, among the several objects of this invention may be noted the provision of improved apparatus and method for handling work (such as paper or similar articles) wherein all operations are automatically carried out without the need for constant attention by a worker; the provision of apparatus and method for handling work wherein a series of operations are performed on the work as it travels in substantially a straight line into one side of a work station, through the work station and out the other side of the work station; the provision of apparatus and method for performing a series of steps on successive pieces of work as they travel along a path wherein jamming due to accumulation of work at a point in the path of the work is virtually eliminated; the provision of apparatus for delivering work to a work station wherein the work may be received at various heights directly from other apparatus and then accurately aligned for delivery into the work station; the provision of apparatus of the type described wherein work too wide to enter the work station or so misaligned when received by the apparatus that it cannot be handled by the aligning portion of the apparatus is detected and automatically removed from the normal path of travel of work between the entrance of the apparatus and the work station; the provision of apparatus for receiving work, moving it to a work station, stopping it at the work station, performing an operation on it at the work station, and then moving it through the work station substantially in line with the path of travel of the work to the work station; the provision of apparatus of the type described wherein closely spaced successive pieces of work can be handled by the apparatus, and a piece of work not operated upon in the work station within a specified time interval is passed through the work station and then removed from the normal path of travel of the next piece of work which is operated upon in the work station; the provision of a control system for apparatus for performing a series of operations on work wherein the various operations performed by the apparatus are initiated by sensing the presence of the work at particular places in its path of travel or by completion of the previous operation; the provision of apparatus for punching paper or other work wherein the work is squared and delivered to a punching station, stopped, punched, and then passed through the punching station, and to such apparatus wherein work is removed from the normal path of travel on the apparatus if it is too wide or misaligned to be squared for delivery to the punching station or if it is not punched within a predetermined time interval following delivery to the work station; the provision of a method for handling work through a plurality of operations wherein high speed continuous operation is possible without a sacrifice in quality of the operations performed on the work; and the provision of a method for handling paper or other work wherein successive steps are initiated by the presence of the work or by completion of the previous step in the method. Other objects and features will be in part apparent and in part pointed out hereinafter.

The invention accordingly comprises the constructions and methods hereinafter described, the scope of the invention being indicated in the following claims.

In the accompanying drawings, in which one of various possible embodiments of the invention is illustrated, FIG. 1 is a plan view of an apparatus of this invention with certain features omitted for clarity;

FIG. 2 is a diagrammatic view showing movement of work from the entrance to the exit or outlet end of the FIG. 1 apparatus and illustrating certain steps of the method of this invention;

FIG. 3 is an elevation of the FIG. 1 apparatus showing in phantom moved positions of portions of the apparatus;

FIG. 4 is an enlarged fragmentary longitudinal section taken at the entrance end of the apparatus (the right end in FIG. 1);

FIG. 5 is a fragmentary section taken along line 5—5 of FIG. 4;

FIG. 6 is an enlarged fragmentary longitudinal section which is substantially a continuation of the FIG. 4 section;

FIG. 7 is a fragmentary detail view of a portion of the FIG. 6 apparatus;

FIG. 8 is an enlarged fragmentary longitudinal section which is substantially a continuation of the FIG. 6 section;

FIG. 9 is a fragmentary transverse section showing portions of the side aligning device;

FIG. 10A is a transverse section taken at the work station and showing the means for moving the gate dump mechanism;

FIG. 10B is an elevation taken from the right end of FIG. 10A;

FIG. 12 is a detail view of portions of the gate mechanism;

Corresponding reference characters indicate corresponding parts throughout the several views of the drawings.

Figure 10:
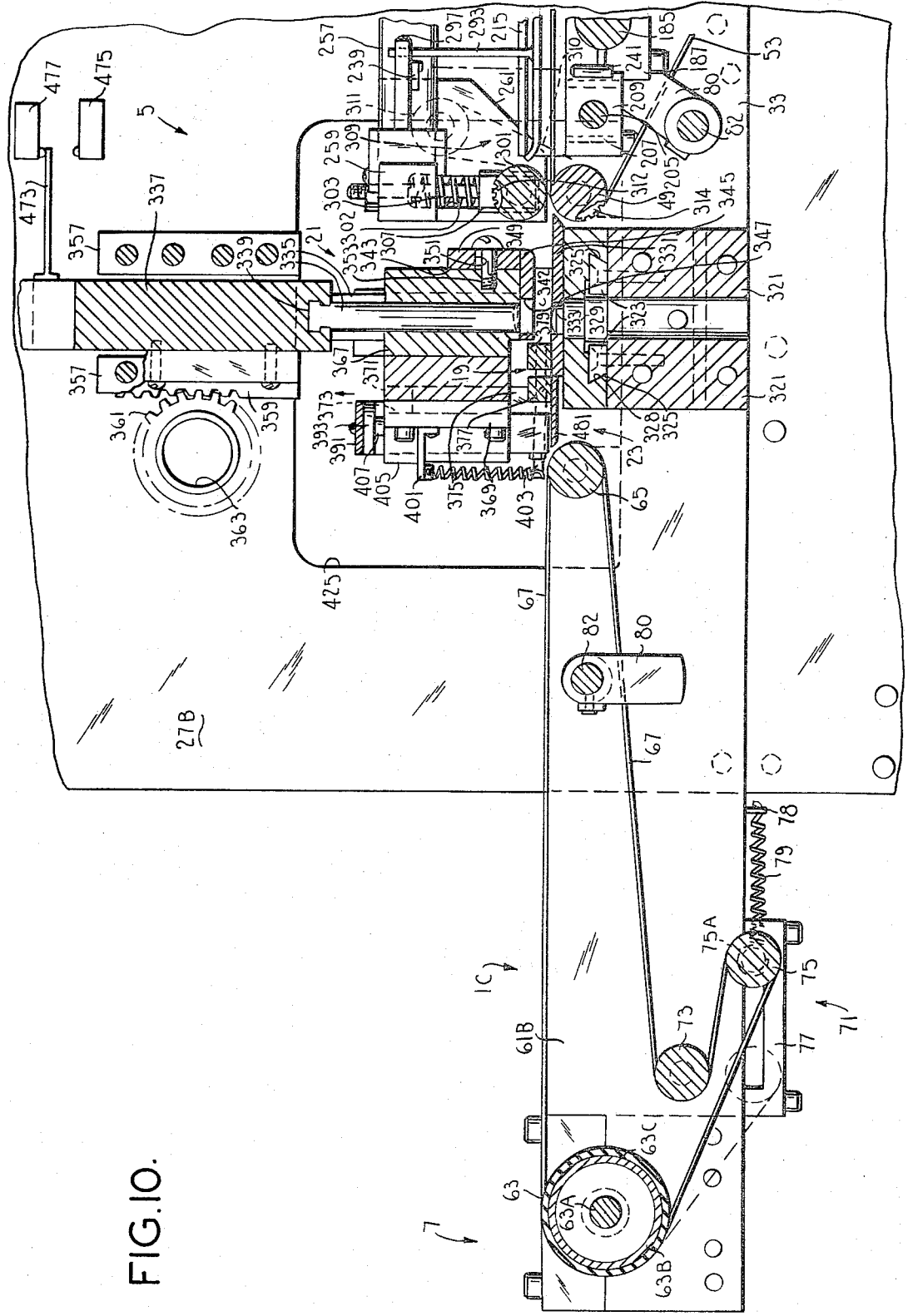
FIG. 10 is an enlarged fragmentary longitudinal section of the outlet or exit end of the apparatus.

Unless otherwise specified in the following description, the terms "left" and "right" refer to these directions when viewed from the right ends of FIG. 1 looking toward the left end of FIG. 1.

Generally, the apparatus of this invention includes a conveyor system designated in its entirety by the numeral 1. Conveyor system 1 comprises three conveyors 1A, 1B, 1C in end-to-end relation. These conveyors receive pieces of work W (FIG. 2) at an entrance or inlet end 3 of the apparatus and convey them first into a work station generally indicated at 5 where an operation is performed on the work and then to an outlet or exit end 7 of the apparatus where it is discharged from conveyor 1C onto a work receiver, a conveyor, etc. (not shown). As shown in FIG. 1, a conveyor 1A is skewed relative to conveyors 1B and 1C. As the work W proceeds along conveyor 1A from inlet end 3 of the apparatus, it is moved by conveyor 1A against a side guide 9 generally parallel to the path of travel P (FIG. 2) of the work on conveyors 1B, 1C. This achieves an approximate, preliminary alignment of one side of the work relative to the inlet of the work station and a side aligning mechanism generally designated 11.

A microswitch 13 spaced from guide 9 at the left end of conveyor 1A senses the presence of work W which is either too wide or so misaligned on conveyor 1A that it cannot enter side aligning device 11. When switch 13 senses such work, it completes a circuit (described later) which operates a dump or abort mechanism 15 between conveyors 1A, 1B for removing this work from the normal path of travel P of the work. It will be understood that normally pieces of work W are successively fed to conveyor 1A in spaced relation to each other and that ordinarily the work passes switch 13 without closing the circuit to dump mechanism 15 and is delivered by conveyor 1A to conveyor 1B so that it enters side aligning device 11 for final side alignment of the work before it enters the work station.

Work that enters the side aligning mechanism 11 is aligned by movement of the work to one side (the left side shown at the bottom in FIG. 2) against a stationary (but adjustable) side guide. An end squaring device generally designated 17 then engages the trailing end of work W and moves it into work station 5. A gate mechanism 19, positioned (at this time) across the path of travel P of the work, stops the work in the work station with its sides and ends accurately aligned. While the work is stopped in the work station an operation is performed on it. For example, a punching device shown generally at 21 may be located at work station 5 for punching holes in work W. Upon completion of this operation, gate 19 is moved out of the way of the work, and the work is moved by conveyor 1B onto conveyor 1C for removal from the apparatus.

There is a timing circuit (described later) initiated by the work as it travels along path P and enters the work station. In the event the punching operation is not performed within a predetermined time interval (as determined by the timing circuit), then gate 19 is elevated and a second abort or dump mechanism 23 located between conveyors 1B and 1C is actuated for removing the unpunched work from the normal path of travel P.

More particularly, the apparatus of the invention comprises an upright frame generally designated 25 (FIG. 3) which includes left and right vertical and generally parallel plates 27A and 27B (FIG. 1) at the left and right side, respectively, of the apparatus at work station 5. Conveyor 1C and the left end of conveyor 1B are supported by plates 27A, 27B. Plates 27A, 27B are supported by legs 29 (FIG. 3). The inlet end of conveyor 1B shown at the right in FIGS. 1 and 3 is supported by legs 31 which are attached to two parallel side rails 33 of conveyor 1B by bolts 35, FIG. 6. Legs 29, 31 may be provided with rollers or wheels (not shown) for moving the apparatus.

Conveyor 1A includes side rails 37A, 37B at the left and right sides, respectively, of the conveyor. Conveyor shafts 39, 41 and 43 extend between and are journalled in side rails 37A and 37B. The axis of shaft 43 is subtantially perpendicular to the length of side rails 37A, 37B while the axes of the shafts 39 and 41 are angularly disposed relative to shaft 43 and are not perpendicular to side rails 37A, 37B. Thus shafts 39, 41 are skewed relative to the length of conveyor 1A. There are a plurality of endless belts or fabric straps 45 trained around conveyor shafts 39, 41, the upper reaches of which receive work at the inlet end 1 of the apparatus and move it toward conveyor 1B and against side guide 9 at the left side of conveyor 1A. Conveyor shaft 43 is driven from shaft 41 by a chain and sprocket drive generally designated 47. By rotating shaft 43, movement of work onto conveyor 1A is facilitated.

Conveyor roller 39 preferably includes a central shaft 39A coaxial with a cylinder 39B covered with a soft coating 39C of rubber, plastic, etc. Annular spacers 40 are secured to cylinder 39B and shaft 39A for joint rotation of these parts.

Figure 13:
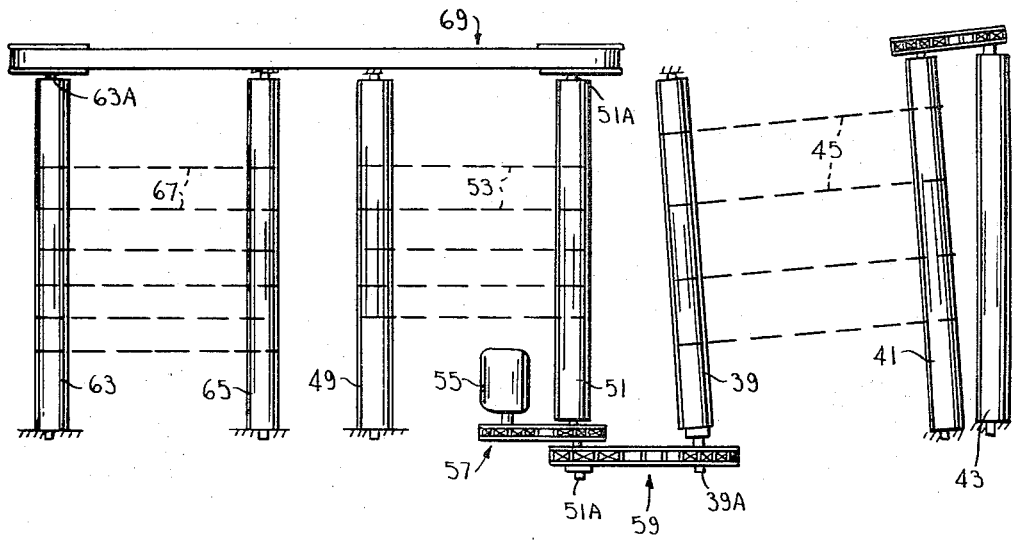
FIG. 13 is a diagrammatic view of the drive mechanism for the conveyor system of the apparatus.

Conveyor 1B comprises conveyor rollers 49 and 51 positioned between side rails 33. There are a plurality of endless belts or tapes 53 trained around conveyor rollers 49, 51 and the work moves along the upper reach of these tapes. Conveyor roller 51 is similar to roller 39 and includes a central shaft 51A connected through spacers 52 to a cylinder 51B covered with soft rubber, etc. 51C. Conveyor shaft 51A (and thus roller 51) is driven by an electric motor 55 (FIG. 13) through a chain and sprocket drive designated 57. Conveyor 1A is driven from conveyor roller 51 by a chain and sprocket drive generally shown at 59 in FIGS. 1 and 13. The sprockets for drive 59 are attached to shafts 39A and 51A.

The conveyor 1C comprises left and right side rails 61A and 61B, respectively, which are generally parallel to each other at opposite sides of the conveyor. Journalled in ends of side rail 61A and 61B are conveyor rollers 63 and 65 about which a plurality of belts or tapes 67 are trained. Conveyor rollers 63, 65 are generally parallel to each other and are positioned so that the upper surface of belts 67 are substantially coplanar with the upper surface of belts 53 on conveyor 1B. Also, roller 63 may be of the same construction as rollers 39, 51 previously described. The rollers of conveyors 1B, 1C are arranged so that the work path of travel P (FIG. 2) is moved in substantially a straight line from the entrance end of conveyor 1B to the outlet or exit end of conveyor 1C.

Conveyor roller 63 is driven from conveyor roller 51 of conveyor 1B by a belt, pulley arrangement generally designated 69. The pulleys of this drive may be attached to shafts 51A and 63A of these rollers. Thus conveyors 1A, 1B, 1C are simultaneously driven from motor 55. The rubber or plastic coating on conveyor rollers 51, 39 and 63 prevents slipping of the tapes on the rollers which are driven.

Slack is taken out of the tapes or belts 45, 53 and 67 by a series of belt tightners generally designated 71, FIGS. 6, 8 and 10. The belt tightners include idler rollers 73 journalled in the respective conveyor side rails and rollers 75 having spindles 75A at their ends which project into slots formed by the lower edge of each conveyor side rail and brackets 77 attached to the side rail lower edges. The conveyor belts are trained around rollers 73, 75, Helical springs 79 stretched between connections shown at 78 to the side rails of the conveyors and the spindles 75A pull rollers 75 away from roller 73, thereby holding the belts or tapes tight. Lateral movement of the belts or tapes along their rollers is prevented by U-shape belt guides 80 (FIGS. 8, 10) fixed on rods 82 extending between the respective conveyor side rails. While belt tightners 71 are designed to simultaneously tighten all of the belts of a conveyor, it will be understood that separate tightners can be used for each belt.

While conveyors 1B and 1C are supported directly by frame 25, conveyor 1A is preferably mounted on the adjacent end of conveyor 1B so that the inlet end 3 of the apparatus can be raised and lowered like a ramp to receive work at various heights. A preferred means for carrying this out is illustrated in FIGS. 3 and 6–8 and includes spacer members 81 positioned between side rails 37A, 37B of conveyor 1A and two ratchet plates 83. The spacer 81 and plate 83 at each side of conveyor 1A are bolted to the side rail at that side of the conveyor by a plurality of bolts 85. Plates 83 project beyond the left end (as viewed in FIG. 7) of the side rails 37A, 37B and are positioned outside and adjacent the rails 33 of center conveyor 1B. A spacer 89 on each end of shaft 51A has a central portion 89A positioned in a recess in frame leg 31 between plate 83 and side rail 33. Each spacer 89 has a boss 89B at one end press-fitted into a side rail 33 and there is another boss 89C at the other end journalled on shaft 51A and in plate 83 by bearings designated 88. The arrangement of the parts is such that side plates 37A, 37B of conveyor 1A, spacers 81 and plates 83 may be rotated about the axis of roller 51 of conveyor 1B for adjusting the height of entrance end 3 of the apparatus.

At the left end of plate 83 there are a plurality of ratchet teeth 91 arranged in an arcuate sector having as its center of curvature the axis of roller 51 and its shaft 51A. A shaft 93 projects across conveyor 1B through side rails 33. Keyed to each end of shaft 93 are pawls 95 which are biased into engagement with teeth 91 by springs 97 connected to pawls 95 and to the side rails 33. The connections between pawls 95 and teeth 91 provide means for holding the conveyor 1A in an adjusted position, the range of positions as illustrated in FIG. 3 comprising approximately 55° movement between the lower dotted line position and the upper dotted line position. Since conveyor 1A moves about the axis of shaft 51A of roller 51 of conveyor 1B, the relation between conveyor rollers 39 and 51 of the two conveyors remains constant throughout the range of movement. Thus adjustment of conveyor 1A does not effect orderly transfer of work from conveyor 1A to conveyor 1B.

The spacer plates 81 each have a post 99 projecting upwardly above the side rails of conveyors 1A and 1B. There is a rod 101 supported at its ends by posts 99. A collar 103 (FIG. 1) on rod 101 is adjustable longitudinally along the rod and may be fixed at any adjusted position by a set screw or other suitable fastening means. An arm 105 carried by collar 103 supports the switch 13 which controls operation of the abort or dump mechanism designated 15. As best illustrated in FIG. 6, there is a leaf 107 hinged to the forward end of the housing for switch 13. By adjustment of collar 103 and arm 105, switch 13 is located on conveyor 1A so that when work is so wide or so misaligned on this conveyor that it cannot properly enter the side aligning device 11, the work will engage the leaf 107, causing it to swing upwardly and close switch 13.

Referring now to FIGS. 1, 4 and 5, guide 9 is shown to comprise an angle iron designated 111 which extends longitudinally along conveyor 1A and has a vertical face 111A against which work is moved by operation of conveyor 1A. There is a second angle 113 clamped by bolts 114 and nuts 116 to face 111A. Angle 113 has a lower face 113A which projects outwardly from face 111A. Face 113A of angle 113 helps hold down the upper surface of work W as it passes along conveyor 1A partially within the guide 9. This hold-down feature is particularly desirable when conveyor 1A is in its lowermost FIG. 3 position since the left edge of the work is then held in such a position that it is easily transferred to conveyor 1B.

There is a plate 115 on which angle 111 rests. This plate extends between conveyor shafts 39 and 41 and between the side rails 37A, 37B of the conveyor, the plate being attached to the side rails by angle irons 117. Plate 115 and angles 111 and 113 define a generally channel shaped space. The upper reach of conveyor tapes 45 passes along the upper surface of plate 115 as shown in FIGS. 1 and 5.

Plate 115 is slotted as shown at 119 (FIGS. 1, 4 and 6) and there are a plurality of screw follower blocks 121 positioned beneath the slots 119. Bolts 123 connect blocks 121 to angle 111 of guide 9. Screws 125 are journalled at their ends in bearings 127 (FIG. 5) and the left side rail 37A of conveyor 1A. Screws 125 pass through screw follower blocks 121 so that rotation of screws 125 moves the blocks along the axis of the screws and thereby adjusts guide 9 toward and away from the side rail 37A of conveyor 1A. The screws 125 are coupled to each other by a chain and sprocket drive designated 129 (FIGS. 1, 3 and 5). A handle 131 connected to one of the sprockets is turned for simultaneously rotating both screws.

Referring now to FIGS. 1 and 5, a work holddown structure generally designated 133 comprises a plurality of balls or marbles 135 contained by an elongate cage 137 which is substantially parallel to the tapes 45 of conveyor 1A. Cage 137 is attached to one end of arms 139 by a connection indicated at 141. The other end of each of the arms 139 has an elongate slot 143 to provide an adjustable connection to supporting blocks 145 carried by angle 111 of guide 9. This adjustable connection is effected by a bolt or screw 147 which passes through slot 143 into block 145 and is tightened to clamp the arm 139 to block 145 when cage 137 is properly positioned. Each of the arms 139 is individually adjustable so that the angle they form with side guide 9 can be varied within their horizontal plane as required. The marble bar structure 133 holds down paper or other work as it travels along conveyor 1A. This also results in the work moving at a rate determined by the velocity of tapes 45. In the absence of marble bar structure 133 holding the work down on tapes 45, the work could fail to move at the desired speed, particularly when the conveyor 1A is inclined upwardly or downwardly as shown in the dotted lines in FIG. 3.

When the ramp conveyor 1A is in a lowered position (as illustrated in dotted lines in FIG. 3) there is a tendency for work being transferred from conveyor 1A to conveyor 1B to ride up or raise up as it is transferred from the inclined conveyor 1A to the generally horizontal conveyor 1B. To avoid this there are a plurality of holddown devices at the intersection of conveyors 1A and 1B.

These hold-down devices are generally designated 151 and each comprises an arm 153 fixed to rod 101 by a set screw 155. Arms 157 are pivoted about rod 101 adjacent arms 153 and each has an adjustable connection designated 159 with a roller mounting member 161. The mounting members 161 are bifurcated at their outer end and carry roller 163 adapted to be positioned above conveyor roller 51. A spring 165 reacts from the fixed arms 153 against arms 157 pivoted on rod 101 to bias arm 157 and the rollers 163 downwardly into contact with the work passing between it and conveyor roller 51. Since rollers 163 are carried by rod 101 (which in turn is supported from conveyor side rails 37A, 37B) the rollers 163 will swing with conveyor 1A about the axis of shaft 51A of conveyor 1B, thereby maintaining a constant relation between conveyor roller 51 and the hold-down rollers 163. Rollers 163 are particularly desirable for changing the direction of movement of papers or similar flexible, light-weight pieces of work.

The mid machine dump mechanism generally designated 15 is shown in FIGS. 1, 2 and 6 to comprise an elongate plate 169 which tapers from a wide left end (shown at the bottom in FIGS. 1 and 2) to a relatively narrow right end. The forward edge of plate 169 is closely adjacent the conveyor roller 39 and its upper surface is substantially coplanar with the upper surface of the plate 115 of conveyor 1A. Mounting blocks 171 are attached at the ends of plate 169 to its upper surface and they each pivot at 173 on the upright post 99 of the spacer member 81, thereby pivotally mounting plate 169 for swinging movement about the axis of pivot 173.

A solenoid 175 shown carried by rod 101 has a connection designated 177 to plate 169 so that when solenoid 175 is energized and its rod or core retracted, plate 169 swings counterclockwise (as viewed in FIG. 6) about pivots 173, thereby elevating the right or forward end of plate 169 to place the plate across the normal path of movement of work W. The winding for solenoid 175 is in the circuit that is completed when switch 13 is closed. Thus it will be seen that when switch 13 is closed by work passing beneath it, the solenoid 175 tilts plate 169 and the misaligned or excessively wide work sensed by switch 13 is discharged downwardly between conveyor rollers 39 and 51. The misaligned portion of this work may be collected and subsequently rerun through the machine.

In the left end of plate 169 there is an elongate slot 179. A guide bar 181 is adjustably clamped to plate 169 through slot 179 and it is positioned so that its right surface is substantially in line with the inner face 111A of guide 9 on conveyor 1A.

The side squaring device 11 is best illustrated in FIGS. 8 and 9 where it is shown to comprise two spaced rods 185 carried by the side rails 33 of conveyor 1B and located between the upper and lower reaches of the tapes 53 of the conveyor. Each rod 185 telescopes through two blocks 187, the blocks being fixed in adjusted positions along the rods by set screws 189. There is a narrow plate 191 attached to the upper surface of the two blocks 187 at the left end portion of each of the rods 185 and another plate 193 is attached to the upper surfaces of the other two blocks 187.

Mounted on plate 191 and extending generally parallel to the path P of travel of the work W on the apparatus is an elongate C-shaped guide generally designated 195. Guide 195 comprises an angle shaped member 197 having an upper horizontal surface 199 located in a generally horizontal plane and substantially coplanar with the upper reach of tapes 53. Member 197 has a vertical surface 200 against which work is aligned. A sheet or strip 201 is attached at 203 to angle member 197 to complete the C-shaped guide 195. Strip 201 is preferably made from clear plastic so that the operator of the apparatus can observe operation of the side aligning device 11 and insure that the work W is being moved against vertical surface 200 of the angle member 197. While the C-shaped guide 195 is adjustable transverse to the path of travel of the work by loosening set screw 189 and moving block 187, this guide does not move during normal operation of the apparatus and therefore may be referred to as a stationary guide. One end of guide 195 is adjacent guide 181 on dump plate 169. Surface 200 of guide 195 is substantially in line with the right or inner surface of the guide 181 and with the surface 111A of the guide 9 on the ramp or inlet conveyor 1A. Any tolerance in this misalignment should be to place surface 200 slightly to the left (when viewed facing in the direction of movement of work W) so that work W will not engage the inlet end of guide 195 and cause skewing or jamming of the work at this point in its travel.

The slide aligning device 11 includes two guide pins 205 projecting horizontally from blocks 207 (FIG. 8) attached to plate 193 adjacent the block 187. Pins 205 are substantially parallel to each other and substantially perpendicular to the path of movement of the work on conveyor 1B. Pins 205 telescope through bushing blocks 209, the blocks being movable axially along pins 205.

Attached to blocks 209 is a plate 213 which supports a generally C-shaped guide 215. The upper side of guide 215 is flared outwardly at its open (left) side as indicated at 217 (FIG. 9) and also at its inlet or mouth end as shown at 219 (FIG. 8). Guide 215 has an inner vertical surface 221 for engaging the right edge of work.

Work carried by conveyor 1B passes between the C-shaped guides 195 and 215 and initially there is some clearance between the work and inner surfaces 200 and 221 of the guides. By moving bushing blocks 209 to the left (as viewed in FIG. 9) on pins 205, the C-shaped guide 215 is moved toward the C-shaped guide 195, thereby engaging the inner surface 221 of guide 215 with the right edge of work W for moving the work to the left against the surface 200 of guide 195.

Attached to the bottom of plate 213 is a generally channel shape cam 223 which is open at the bottom. A cam follower 225 rides in the cam 223 and is connected at 227 to one end of a lever arm 229. A center portion of lever 229 is pivoted at 231 on the lower end of a pivot 233 depending from the bottom of plate 193. The other end of lever 229 is coupled to the core or plunger of a solenoid 235 by a connection designated 236. Solenoid 235 is mounted on the under side of the plate 193 adjacent lever 229. The parts are arranged so that lever 229 is normally inclined relative to the length of cam 223 as shown in FIG. 1. With this arrangement, solenoid 235 can be energized to retract its core, thereby moving lever 229 about its pivot 231 for moving cam follower 225 in cam 223, thus moving the bushing blocks 209 axially along the pins 205. This movement, as explained before, moves the C-shaped guide 215 toward the C-shaped guide 195. When solenoid 235 is deenergized, its core is extended by a spring (not shown) which constitutes a part of the solenoid. Extension of the solenoid core moves lever 229 to return the parts to their FIG. 9 position. Solenoid 235 is energized by a circuit (described later) which is closed as a result of a piece of work W travelling on conveyor 1B passing between the C-shaped guides 195 and 215 to break a light beam between a light source 239 positioned above the guides and a photoelectric cell 241 carried by rod 185 (at the left in FIG. 8).

The end squaring device 17 is shown in FIGS. 1, 3 and 8 to comprise a superstructure generally designated 245 which includes a generally U-shaped entrance end support and pivot bar 247 having legs 249 pivoted at 251 in generally U-shaped openings 253 at the top of vertical plates 255 adjustably mounted on the side rails 33 of conveyor 1B. Projecting forwardly from the center portion 256 of the pivot bar 247 are two rods 257. The other end of rods 257 are attached to a cross bar 259 which is connected at its ends to two support brackets 261 resting on the upper edges of the side rails 33 of conveyor 1B.

There is a block 265 slidable along each of the bars 257 and adapted to be fixed at various positions on the bars by a set screw 267. Attached to the bottom side of blocks 265 and extending therebetween is a plate 269 which carries a solenoid 271.

Projecting forwardly from the bottom of plate 269 are a plurality of bearing plates 273 which rotatably mount a shaft 275. Attached to shaft 275 are a plurality of kickers 277 which have at their lower rearward portions downwardly extending feet 279 adapted for swinging movement about shaft 275 between the solid and dotted line positions shown in FIG. 8. The kickers, when elevated to the solid line position, are out of the path of movement of the work as it travels along the conveyor 1B, but on clockwise rotation of shaft 275 they are swung downwardly to the dotted line position for engaging the trailing edge of the work as it passes beneath the kickers 277, thereby pushing the work forwardly or to the left as viewed in FIG. 8. The kickers 277 are adjustably clamped on shaft 275 by bolts 281 which extend across slots 283 in the kickers and are adjusted to open and close the width of the slot 283, thereby clamping the kickers onto shaft 275.

Also mounted on shaft 275 and projecting above kickers 277 is a bell crank arm designated 285 which is fixed to shaft 275 and has a connection designated 287 to the core or plunger of solenoid 271. Crank arm 285 is moved between its solid and dotted line positions by operation of solenoid 271, thereby causing rotation of shaft 275 and movement of the kickers 277 between their solid and dotted line positions. Thus work W is moved to the left in FIG. 8 in response to energization of solenoid 271. A circuit (described later) to solenoid 271 is completed upon closing of a microswitch 289 (FIG. 1) by the lever 229 as it moves guide 215 of the side aligning device to the left. Thus it will be seen that operation of the end squaring device is initiated as the operation of the side aligning device is completed.

A lever arm 290 on shaft 275 is moved from its solid line position to its dotted line position when solenoid 271 is energized to engage a leaf 292 on a switch 565 (FIGS. 1, 8 and 17) for closing the switch. This switch senses completion of the end squaring operation and must be closed before the punch mechanism will operate.

A plurality of elongate anti-buckling hold-down bars 291 are suspended from posts 293 hanging from supports 295 carried by the pivot bar 247 and by the rod 259. Posts 293 are preferably vertically adjustable in their supports 295 by set screws 297 or other suitable means. The bars 291 are positioned between the C-shaped guides 195 and 215 of the side aligning device and above the work W as it passes therebetween. Bars 291 prevent buckling of lightweight flexible work (such as paper stock) as it is moved by the side aligning device 11 and the end squaring device 17.

In order to positively feed work W into the work station 5, there is a hold-down and drive roller 301 (FIGS. 8 and 10) between the two side supports 261 which rest on the side rails 33 of conveyor 1B. The roller 301 has spindles 301A projecting from its ends through slots 302 in the supports 261. Helical springs 303 are seated in spring retainers 307 which bear against the spindles 301A of roller 301. Helical springs 303 react from cross bar 259 for biasing the roller 301 downwardly into engagement with the work W as it passes between roller 301 and the conveyor roller 49. Thus roller 301 is free for limited vertical movement as required by work passing beneath the roller.

Roller 301 is preferably driven in a clockwise direction (as viewed in FIGS. 8 and 10) so that it will cooperate with roller 49 for forceably moving work into work station 5. This is accomplished by a chain and sprocket drive designated 309 comprising a chain 310 trained around a sprocket 311 on one support 261 and other sprockets 312 and 314 attached to the ends of roller 301 and conveyor roller 49, respectively. Thus when conveyor roller 49 is turned (by operation of the conveyor 1B), the roller 301 is also rotated but in the opposite direction of roller 49. Spring 303 maintains a driving connection between roller 301 and the chain and sprocket drive 309. This chain and sprocket drive 309 also holds down supports 261 and the attached structures, thus limiting upward movement of roller 301 except when it overcomes the biasing force of springs 303.

Should work become jammed between rollers 301 and conveyor roller 49, or if access is required to the work station 5 from its right side or entrance end as viewed in FIG. 10, then roller 301, supports 261 and the superstructure 245 which carries the end squaring device 17 can be readily removed from the apparatus by removing the chain 310 of chain drive 309 from sprocket 311, then lifting pivots 251 from their supports 255 at the rear of the superstructure and pulling upwardly and outwardly on the superstructure. This will remove the entire end squaring device, the hold-down roller 301 and its associated structure, bars 391 and the photoelectric cell 241.

Figure 11:
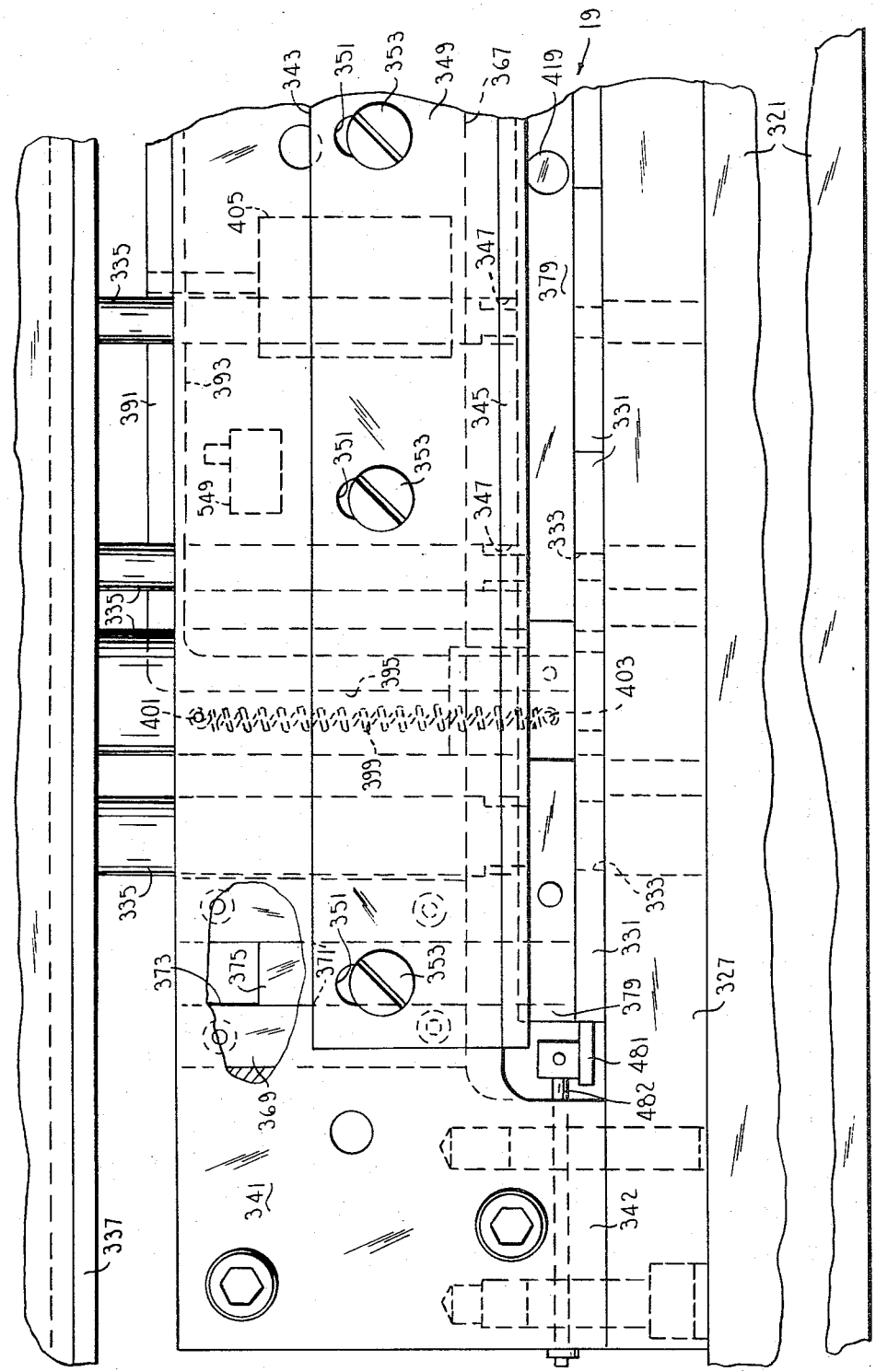
FIG. 11 is an enlarged fragmentary view showing portions of the punch, the gate and the mechanism for moving the gate.

The apparatus of this invention is shown in FIGS. 10-12 to include mechanism for punching work at the work station. The punch mechanism includes two spaced, generally parallel support rails 321 which extend between the upright plates 27A, 27B of the frame 25 and are beneath the path of travel of work W. Fixed to the upper surface of the rails 321 are two spaced, elongate bars 323 which are undercut at 235 along their outer edges to jointly form a generally dove-tail shape mounting member. A mounting plate 327 has a dove-tail shape recess 328 on its lower surface for mating engagement with the bars 323. Plate 327 has centrally located holes or openings 329 aligned with the space between bars 323 and rails 321. Fastened to the upper surface of plate 327 in end-to-end relation are punch dies 331 which have holes 333 shaped and sized to receive punches described later. Holes 333 are aligned with holes 329 in plate 327 so that the punches, if necessary, may pass through holes 333 and into holes 329. Material punched from the work is forced through these holes and drops between rails 321. The upper surface of dies 331 is substantially coplanar with the upper surface of the conveyor tapes 53 on conveyor 1B so that work passing between conveyor roller 49 and the feed roller 301 immediately above it passes smoothly onto the dies.

There are a plurality of punches 335 positioned above and axially aligned with holes 333 in dies 331. Punches 335 may be of various sizes and shapes as illustrated in FIGS. 10 and 11. The punches are attached to a vertically movable ram 337 by a connection designated 339 and on movement of ram 337 punches 335 reciprocate through holes in a punch guide block 341. As shown in FIG. 11, block 341 has a lower central portion spaced above dies 331 and legs 342 at its ends which are attached to the die mounting plate 327 and which straddle work as it travels through work station 5.

Attached to the lower front face of the punch guide block 341 in an L-shaped stripper 343 having a lower plate 345 which has holes 347 aligned with the lower ends of punches 335. Stripper 343 also includes a vertical plate 349 which has a series of vertically elongate slots 351 for receiving screws 353 for mounting stripper 343 on the punch guide block 341. Since slots 351 are elongate, stripper 343 may be vertically adjusted by loosening screws 353, moving the stripper to the desired position, and then again tightening the screws. This provides for a variable spacing between the lower surface of the horizontal stripper plate 345 and the upper surface of die 331. Stripper 343 effects quick release of the work from the punches as the punches travel upwardly into guide block 341.

The ram 337 is guided for vertical movement by two pairs of ram guide plates 357 (FIG. 10) attached to the frame plates 27A, 27B at opposite sides of the ram. While only one pair of plates 357 is shown, it will be understood that there is a pair of the guide plates at each end of the ram 337.

In order to insure that the ends of ram 337 do not move unevenly as the ram moves up and down, there is a pair of gear racks 359 (one of which is shown in FIG. 10) attached to the ram 337. Racks 359 are in meshing engagement with gears 361 carried by a shaft 363 supported by the frame side plates 27A and 27B. Movement of one end of the ram 337 causes rotation of shaft 363 and this in turn insures equal movement of the other end of the ram.

The gate mechanism 19 comprises a backup plate 367 secured to the back side of the punch guide block 341. There are two gate slide caps 369 connected to the back face of the plate 367. A channel-shaped recess 371 in each end of backup plate 367 is aligned with a similar channel-shaped recess 373 in the gate slide caps 369, the recesses 371, 373 cooperating to form generally rectangular holes which receive gate slide bars 375. One of the slide bars 375 is located at each end of the gate mechanism 19 as illustrated in FIG. 12. Gate slide bars 375 are adapted for vertical sliding movement in the recesses formed by the channels 371 and 373.

Attached to the lower end of gate slide bars 375 and extending horizontally the length of the gate mechanism is a gate backup bar 377. Forward of bar 377 is a gate stop bar 379 which is positionable in the path of work W for stopping the work in work station 5 while it is being punched. The gate stop bar 379 has an adjustable connection to the backup bar 377 so that the position at which the work is stopped in the gate may be varied by adjusting the position of the gate stop bar 379 relative to the backup bar 377. As best shown in FIG. 12 of the drawings, this adjustment is effected by threaded studs 381 secured to gate stop bar 379 and loosely passing through holes in the backup bar 377. By adjusting nuts 383 on studs 381 the gate stop bar 379 can be drawn toward backup bar 377 or permitted to move away from it. There are two studs 385 threaded in the backup bar 377. Studs 385 have ends abutting the rear surface of gate stop bar 379. By adjusting the studs 385 the gate 379 can be pushed away from the backup bar 377 or allowed to move toward it. Thus by adjustment of studs 381 and 385 the gate 379 can be accurately positioned at the work station. Two guide pins 387 are fixed to the gate stop bar 379 and are adapted for sliding movement in holes 389 in the backup bar 377 for guiding the gate stop bar as it is adjusted.

There is means for moving the gate bars 377, 379 between an elevated position out of the path of the work and a lowered position (the position shown in the drawings) where the gate is positioned across the path of the work for stopping it at the work station 5. The gate moving mechanism shown in FIGS. 10–12 comprises a gate lifting member 391 which is of generally inverted U-shape and includes a horizontal center base portion 393 with legs 395 depending from both of its ends. Legs 395 are connected by bolts 397 to the backup bar 377 so that raising and lowering of the gate moving member 391 effects vertical movement of the backup bar 377 and gate stop bar 379. Gate moving member 391 is biased into its normal elevated position for holding the gate elevated by springs 399 stretched between brackets 401 on punch backup plate 367 and pins 403 fastened to the rear surface of the gate backup bar 377.

There is a solenoid 405 fixed to the backup plate 367. The core or plunger of solenoid 405 projects upwardly and has a connection designated 407 to the base portion 393 of the gate moving member 391 so that when the solenoid 405 is energized and its core retracted the gate moving member 391 is pulled downwardly against the biasing force of springs 399 to effect lowering of the gate mechanism to the position shown in FIG. 10 where it is across the path of work W, thereby blocking travel of work through the work station 5. Gate solenoid 405 is energized by a circuit (described later) which closes in response to work being sensed by the photoelectric cell 241.

The punching apparatus is preferably operated in response to work being properly delivered to the work station and stopped by the gate mechanism 19. A preferred means for carrying this out is illustrated in FIG. 12 of the drawings and includes a switch 409 adapted to be closed by a leaf 411 pivoted at one end to the switch housing. Switch 409 is supported by a bracket 413 which is adjustably connected at 415 to the gate backup bar 377. A switch actuating pin 417 slides in the gate stop bar 379 and the backup bar 377 with its outer end being engageable with the free end of the leaf 411 for moving the leaf to control opening and closing of switch 409. Pin 417 has a head end 419. A helical spring 421 seated in the bottom of a counterbored hole 423 in gate stop bar 379 reacts from the bottom of the hole against the pin head 419 for biasing the pin to its FIG. 12 position where its end is disengaged from the leaf 411. The head end 419 of the pin is then slightly forward of the front face of the gate stop bar 379. When work is pushed against the stop bar 379 by operation of the end squaring device 17, the pin head 419 is engaged by the work and retracted into hole 423 against the biasing force of spring 421, thereby forcing the other end of the pin 417 against leaf 411 for closing switch 409. Switch 409 is connected in a circuit described later which results in energization of solenoids for effecting operation of the punch.

Each of the frame side plates 27A, 27B has a large, generally rectangular hole 425 (FIG. 10) which extends vertically from a position above punches 335 to below the die mounting plate 327 and horizontally from a position at the rear of the gate mechanism 19 to a position forward of the spring biased roller 301. These holes or openings 425 provide for access to the mechanism in the work station. All of the gate mechanism and the punch mechanism between ram 337 and the bars 323 can be simultaneously removed through holes 425, thereby facilitating changing of the dies 331 or punches 335. Holes 425 also provide access to the gate mechanism for adjustment of the position of the gate bar 379, and for release of any stock which may become jammed between conveyor roller 49 and the spring bias hold-down roller 301.

Punches 335 and ram 337 are raised and lowered by operation of an air motor 427 (FIG. 14) and the associated air system for controlling the motor. Motor 427 includes a piston 429 which sweeps through a cylinder 431 and moves a connecting rod 433 attached at 435 (FIGS. 3 and 10) to the ram 337.

The air control system for motor 427 (FIG. 14) includes an air pump 437 connected through a regulator 439 to a tank or reservoir 441. At 443 is shown a pilot operated normally open three-way valve of the type commonly referred to as a "pony" valve. Valve 443 and tank or reservoir 441 are always in communication through a coupling 445 is normally open, air from pump 437 and reservoir 441 are normally supplied through valve 443, a conduit 447 and a normally open quick release valve 449 to the lower end of cylinder 431 beneath piston 429, thereby normally holding piston 429 in an elevated position. This holds the punches 335 in their normally elevated position out of the path of travel of the work. Valve 443 is also connected to conduit 445 through a solenoid operated normally closed three-way valve 451 in a branch passage 453. The arrangement is such that when the solenoid of valve 451 is energized (by closing switch 409 due to retraction of pin 417) the valve 451 opens, thereby supplying air to valve 443 for closing of valve 443. Air in the lower portion of motor cylinder 441 may then be exhausted from the cylinder through the quick exhaust valve 449. Regulator 439 may be set so that the air pressure delivered to the lower portion of motor cylinder 441 is at approximately 17 p.s.i., such having been found sufficient for raising the ram and punches.

Pump 437 also provides air under pressure to the upper end of cylinder 431 above piston 429. This is accomplished by providing a pressure regulator 455 communicating with pump 437 and with a tank or reservoir 457 which in turn is connected via a conduit 459 with a solenoid operated, normally closed, three-way "pony" or pilot valve 461. Valve 461 is connected to the upper portion of cylinder 431 by an air line or conduit 463 through a quick exhaust valve 465. The three-way valve 461 is changed from its normally closed position to an open position by operation of a solenoid operated three-way normally closed valve 467 in a pilot or branch passageway 469 between conduit 459 and the valve 461. The operation of the air system between pump 437 and the upper portion of cylinder 431 is the same as that previously described except that the threeway valve 461 moves from a normally closed to an open position when the solenoid of valve 467 is energized. Regulator 455 may be set so that the pressure of air provided to the top of motor 427 is at about 100 p.s.i.

The solenoids for valves 461 and 467 are connected in parallel in a circuit for the air system so that the normally open valve 443 is closed at the same time the normally closed valve 461 is opened. Both of these changes occur as a result of work engaging the head end 419 of pin 417 to close switch 409 at the gate of the apparatus. The net result is that the lower portion of air cylinder 431 is evacuated through valve 439 and air under approximately 100 lbs. pressure is provided to the upper portion of cylinder 431, such air acting on piston 429 to drive it downwardly in the cylinder to lower the punches 335.

Figure 14:
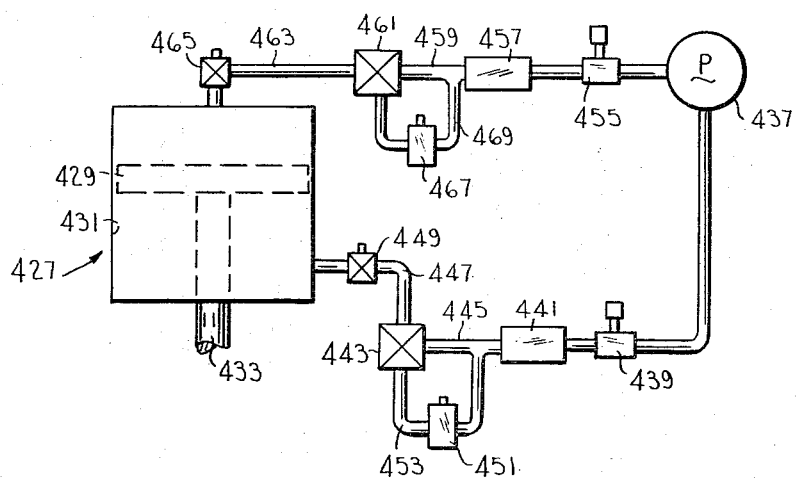
FIG. 14 is a diagrammatic view of the air motor and the air system for operating it.

While the air motor 427 has been shown diagrammatically in FIG. 14, it will be understood that so-called tandem air motors can be used for increasing the total amount of force obtainable from a given air pressure delivered to the motor. For example, using a triple tandem air motor having 6" pistons and an air pressure of approximately 100 p.s.i., the motor can deliver a force of approximately 8,000 to 9,000 p.s.i. to the piston rod.

Projecting from the top of ram 337 is a switch actuator rod 473 (FIG. 10) which moves vertically with the ram 337 and is adapted when the ram is lowered to actuate a microswitch 475 and adapted when the ram is elevated to engage and close a microswitch 477. Switch 475 may constitute means for opening a circuit in the control system (described later) which deenergizes the solenoids of the solenoid operated valves 451 and 467 of the air system, thereby permitting valve 461 to close and valve 443 to open. Then air under pressure is provided to the lower end of cylinder 431 for elevating piston 429 and simultaneously air is vented through the quick release valve 465 to the atmosphere, thus facilitating elevation of the piston. The switch 477 may be used in a sensing circuit for determining that the ram is in the elevated position.

Should the punch mechanism 21 fail to operate within a specified period of time after work has been sensed by photocell 241, the gate solenoid 405 is automatically deenergized so that springs 399 may elevate the gate mechanism to permit work to pass through the work station. The abort or dump mechanism 23 is simultaneously actuated so that the work is not delivered to the conveyor 1C. Abort mechanism 23 (FIGS. 10, 10A and 10B) comprises an elongate plate 481 located between the dies 331 and the conveyor roller 65 of conveyor 1C. Plate 481 is attached at its ends to pivots 482 in legs 342 of guide block 341. Plate 481 is thus adapted for swinging movement between the position illustrated in FIG. 10 where its upper surface is just beneath the path of movement of the work and a pivoted position at an angle to the FIG. 10 position where it is inclined across the path of travel of the work so that when the plate is in its pivoted position work will engage the plate and be deflected downwardly between conveyor roller 65 and the die mounting plate 327.

Plate 481 is moved from its FIG. 10 position to its pivoted position by a dump solenoid 483 on the end of guide block 341 which is connected to one end of a lever 485. The other end of lever 485 is attached to one of the pivots 482 for turning it through an arc so that when solenoid 483 is energized and its core retracted the front edge of the plate is elevated and its rear edge is lowered. The dump mechanism 23 is similar in structure and operation to the dump mechanism 15 between conveyors 1A and 1B.

Figures 15, 16:
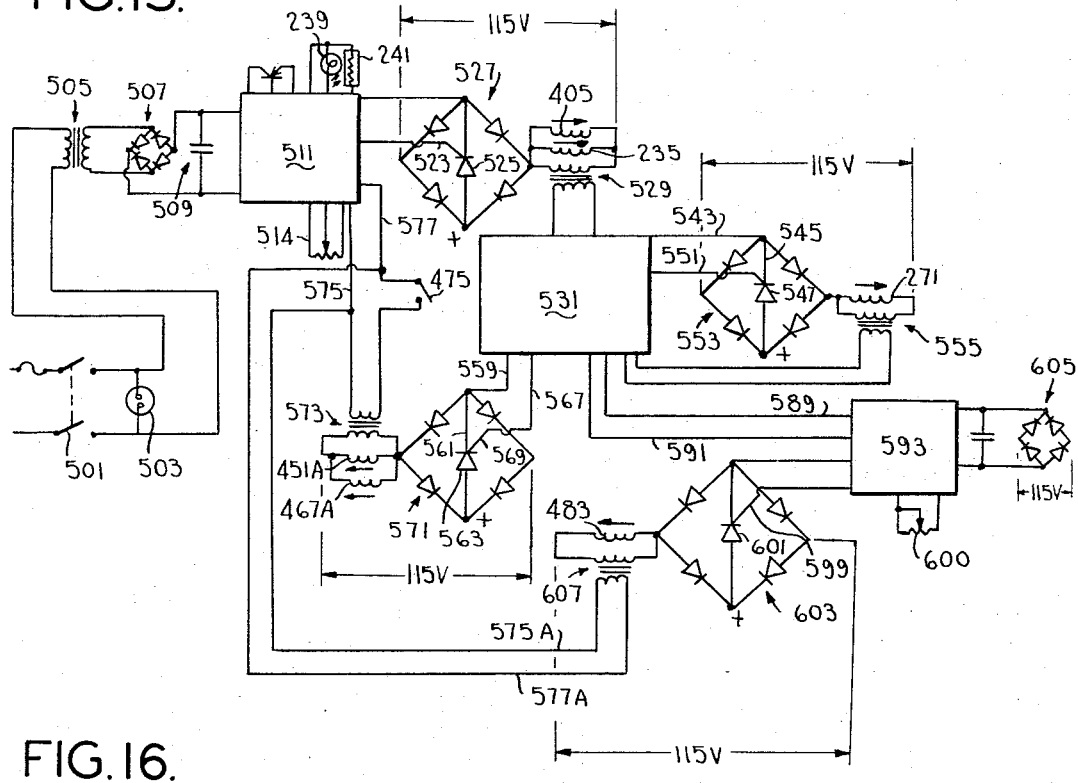
FIG. 15 is an electrical schematic diagram of the control system for the apparatus.
FIGS. 16–18 are detail views of portions of the FIG. 15 schematic view.

Referring now to FIGS. 15–18, the control system for the apparatus is connected to a 115 volt A.C. power line by a master switch designated 501 in FIG. 15. A lamp 503 is connected across the power input line for indicating when switch 501 is closed. The line input is connected to the primary winding of a transformer 505 which steps the line voltage down to the desired voltage, e.g., 24 volts. This voltage is then connected across two terminals of a diode bridge rectifier designated 507 and the rectified voltage is connected to the terminals of a capacitor 509.

This current is then fed into a photoelectric cell amplifier and bistable multivibrator or flip-flop circuit generally designated 511 and illustrated in detail in FIG. 16. The photoelectric cell 241 and light source 239 previously described are shown at the top of FIG. 16. Voltage regulation for circuit 511 is provided by a Zener diode 512 and two transistors 516a, 516b. When the beam of light passing from the light source 239 to the cell 241 is interrupted by a piece of work as it approaches the work station 5 of the apparatus, there is a change in the resistance of the cell 241, and this change in resistance is amplified by an amplifier circuit generally designated 513. The circuit 511 has a variable resistor 514 which controls the sensitivity of the photocell circuit. There is an emitter follower stage 515 which provides a low impedance output to drive a directly coupled "Schmitt trigger" type squaring circuit designated 517. Circuit 517 removes variations in the amplified photoelectric cell signal and provides a definite on-off type of operation. This circuit is capacitively coupled as shown at 519 to a bistable multivibrator or so-called flip-flop circuit 521. This causes the transistor on that side of the flip-flop circuit receiving the pulse to go into conduction, thus turning on an emitter-follower type buffer stage which provides a current of the proper size and polarity to the gate 523 of a silicon controlled rectifier 525 for gating the rectifier into a conductive state.

Silicon controlled rectifier 525 is connected across a full wave diode bridge rectifier circuit designated 527 which has one terminal connected directly to the 115 volt A.C. power line. In series with the other terminal of bridge 527 and the 115 volt line is the winding of the gate solenoid 405, the winding for the solenoid 235 of the side squaring device, and the primary coil of a step-down transformer 529. Thus when a piece of work passes between light source 239 and the photoelectric cell 241, the resulting change in the resistance of the cell 241 gates the silicon-controlled rectifier 525 into a conducting state to provide line current to the solenoids 235 and 405, thereby simultaneously operating the side squaring device 11 and lowering the gate mechanism 19 into the path of the work at the work station 5.

Figure 17:
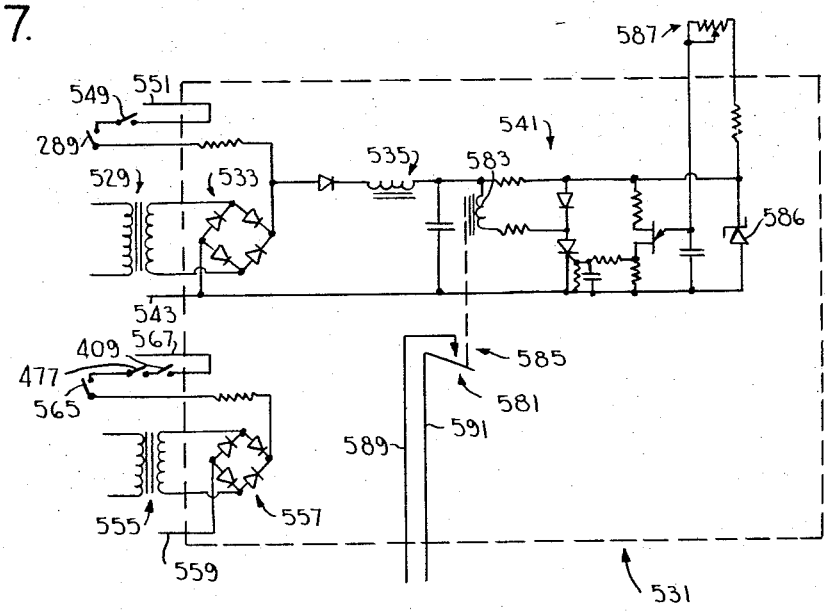

The secondary winding of transformer 529 is connected to a time delay circuit generally designated 531 and illustrated in detail in FIG. 17. The A.C. current from the secondary side of transformer 529 is provided to a full wave rectifier 533 and the rectified current is then filtered by a filter 535. The filtered current is provided to a time delay circuit generally designated 541 described later.

The negative side of the power supply from transformer 529 is taken from bridge 533 via a conductor 543 (FIGS. 15, 17) to the cathode 545 (FIG. 15) of another silicon controlled rectifier 547.

The positive side of the secondary winding of transformer 529 is taken from the rectifier 533 to the sensing switch 289 which is closed when the movable guide 215 of the side squaring device 11 has been moved by its solenoid 235. This is the switch shown adjacent solenoid 235 at the upper left of FIG. 1. Switch 289 is in series with a switch 549 which senses the presence of the gate 19 and is closed when the gate is in its lowered position. As shown in FIG. 11, switch 549 is closed by gate member 391 when it is lowered with the gate. When switches 289 and 549 are both closed, current from the positive side of rectifier 533 is fed via line 551 (FIGS. 15, 17) to the gate of the silicon controlled rectifier 547 shown in FIG. 15 for turning the SCR on.

The SCR 547 is connected across a full-wave diode bridge rectifier generally designated 553 for rectifying current from the 115 volt A.C. power line. The coil of solenoid 271 for the end squaring device 17 is in series with the 115 volt line and the rectifier 553 so that when SCR 547 is conducting solenoid 271 is energized for operating the end squaring kickers 277.

Also in series with the 115 volt line and the rectifier 553 is the primary winding of a step-down transformer 555. The secondary of the transformer is connected to a diode bridge rectifier 557 (FIG. 17), and the voltage from the negative side of this transformer is fed via line 559 (FIGS. 15, 17) to the cathode 561 of a third silicon controlled rectifier 563 (FIG. 15). Current from the positive side of transformer 555 is fed to the switch 565 (FIGS. 1, 8 and 17). Switch 565 senses completion of the end squaring operation. In series with the end squaring switch 565 is the switch 477 which is closed by switch actuator 473 (FIG. 10) when the punch mechanism is in its up position. The switch 409 at the gate which is closed when work is properly squared at the gate is in series with switches 477 and 565. When switches 409, 477 and 565 are closed, current from the positive side of transformer 555 is fed via line 567 (FIGS. 15, 17) to the gate 569 of a silicon controlled rectifier 563 for gating it to a conductive state.

The SCR 563 is connected across a full wave diode bridge rectifier 571 for rectifying current from the 115 volt source. In series with the rectifier 571 and the 115 volt line are the windings for solenoids 451A and 467A for the solenoid operated valves 451 and 467, respectively. These are the valves which, when their solenoids are energized, cause the normally open air valve 443 to close and the normally closed air valve 461 to open, thereby lowering the punch mechanism.

Also in series with the diode bridge rectifier 571 and the 115 volt line is the primary winding of a step down transformer 573. One side of the secondary winding of transformer 573 is connected in series with the punch sensing switch 475 which is closed by arm 473 (FIG. 10) when the punch mechanism reaches its lowered position. The other side of the secondary winding of transformer 573 and the punch sensing switch 475 are connected by lines 575 and 577 (FIGS. 15, 16) to the multivibrator or flip-flop portion 521 of the photoelectric cell circuit.

When the circuit is completed from transformer 573 to the flip-flop circuit, it is reset to its original state, thereby turning off the gate 523 of the silicon controlled rectifier 525 which caused the side squaring device to be activated and the gate to be lowered. By deenergizing these solenoids the side squaring device is returned to its original position and the gate 19 is lifted out of the path of movement of the work by the springs 399. The primary power of transformer 529 is also removed by the turning-off of silicon controlled rectifier 525. Since the secondary of transformer 529 provided gate current for silicon controlled rectifier 547, it, too, must now turn off. This deenergizes the end squaring solenoid 271, thereby permitting the end squaring device to be returned to its normal position. Primary power is removed from transformer 555 at the same time, and it can no longer supply gating current to SCR 563. The consequent turn-off of SCR 563 deenergizes solenoids 451A and 467A for the air controlled valves which operate the motor driving the punch. This returns valves 451, 467 to their normal position, thereby reversing the flow of air to the air motor for elevating the punch and opening the punch sensing switch 475. Turn-off of SCR 563 also removes primary power from reset transformer 573. The work may then clear the machine on conveyor 1C. The photoelectric circuit 511 is not, at this time, sensitive to passage of work between the light source 239 and the cell 241, and the flip-flop circuit 521 will remain in its off state until another piece of work interrupts the light beam.

As previously indicated, when the side squaring silicon controlled rectifier 525 is gated on to energize the side squaring solenoid 235, current is also provided through transformer 529 to a timing circuit generally designated 541 in FIG. 17. If the normal sequence of operations previously described is performed on the work within a predetermined time interval (as determined by the timing circuit 541), then when the flip-flop circuit 521 is reset current to the timing circuit is turned off. If, however, the described steps are not performed within said predetermined time interval to stop the sequence of operations, the timing circuit 541 is not interrupted and it then operates the gate dumping mechanism by energizing solenoid 483.

Timing circuit 541 uses a unijunction type transistor to fire a silicon controlled rectifier which has the armature 583 of a single pole, normally open relay 581 of the dry reed type connected in series with its anode. Application of D.C. voltage from transformer 529, bridge 533 and filter 535 to the circuit starts a timed cycle, the length of which is governed by variable resistance 587. At the end of the preset interval, he unijunction transistor fires the SCR, causing current to flow through the relay armature and close contacts 585. The timing circuit is also regulated by a Zener diode 586.

Figure 18:
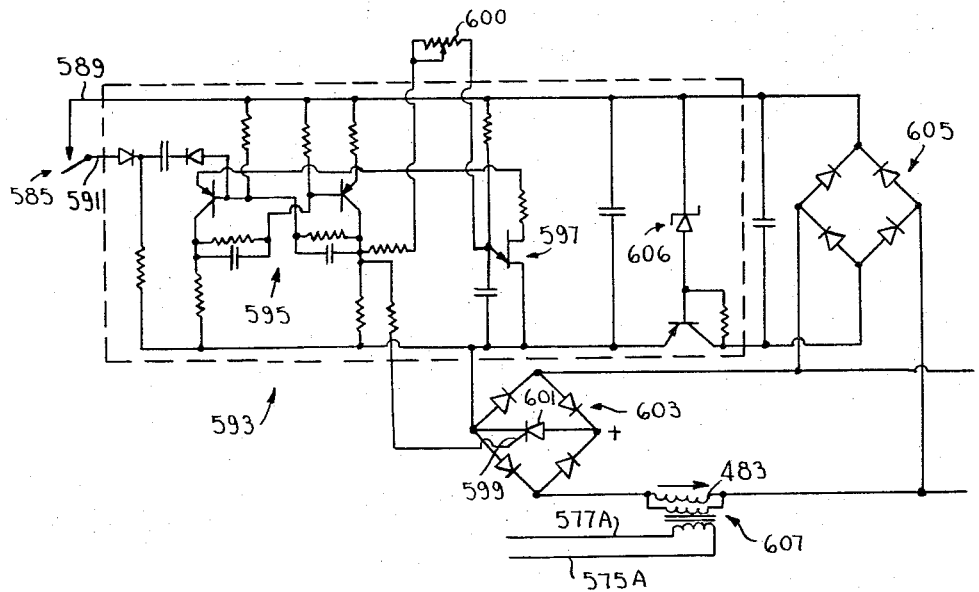

The relay contacts 537 are connected by lines 589 and 591 to a rejector circuit generally designated 593 in FIG. 18. The rejector circuit 593 comprises a monostable or so-called "one-shot" multivibrator 595 which is timed by the firing of a unijunction transistor 597. When the multivibrator circuit 595 is triggered it reverses its state and provides an output signal which is provided to the gate 599 of a silicon controlled rectifier 601 (FIGS. 15, 18). Then, after the expiration of a preset adjustable time delay the multivibrator reverses to its original state, removing the voltage necessary to trigger SCR 601. The time required for the multivibrator to reverse its state is adjusted by the variable resistor 600. The control rectifier 601 is connected across a full wave diode bridge rectifier 603 which is connected across the 115 volt power line in series with the winding of the solenoid 483 of the gate dump mechanism 23. The time delay of the multivibrator 595 results in solenoid 483 being energized for only a short time interval which is just enough to hold the dump plate tilted for rejecting a single piece of work.

Current for operation of the rejector circuit 593 is provided by a full wave diode bridge rectifier 605 connected across the 115 volt line. The circuit voltage is regulated by means of a Zener diode 606.

The circuit for operating the mid-machine dump mechanism 15 is the same as the portion of FIG. 18 previously described except the contacts shown at the upper left in FIG. 18 would be the contacts of the sensing switch 13 and solenoid 175 is connected at the place in the circuit where solenoid 483 is shown.

For the gate dump mechanism 23, a step down transformer 607 is provided having its primary winding connected in parallel to the abort solenoid 483. The secondary winding of transformer 607 is connected via lines 575A and 577A to the same terminals of the photoelectric cell circuit 511 as the lines 577 and 575, respectively. The purpose of this circuit is to reverse the flip-flop circuit 521. This is necessary only for the gate dump mechanism 23 and not for the dump mechanism 15 at the middle of the machine since work discharged by the dump mechanism 15 has not reached the position on the machine where it breaks the light beam from the source 239 to the photoelectric cell 241 which initially operates the flip-flop circuit 521.

Operation of the apparatus will now be described.

The apparatus is prepared for use by inserting the desired size and shape of punches 335 into the ram 337. Then the cooperating die plates 331 are placed in the apparatus by sliding out the mounting plate 327 on which the dies are mounted, attaching the proper dies and sliding them back on the dove-tail mounting bars 323. The side aligning device 11 is properly located relative to the punches and dies by adjusting the left C-shaped guide 195 so that its inner surface 200 is located for guiding the left edge of work into the proper location in the work station 5. Next the right C-shaped guide 215 is adjusted on its mounting so that its inner surface 221 is spaced from the surface 200 of guide 195 by a distance slightly greater than the width of the work W. Then the guides 181 and 9 are adjusted on their mountings so that their inner surfaces will be substantially in line with the surface 200 of the C-shaped guide 195. The switch 13 is then moved laterally along conveyor 1A until it is located relative to guide 9 so that its leaf 107 will be moved upwardly for closing the contacts of the switch when excessively wide pieces of work or misaligned work passes beneath it. Switch 13 is spaced from guide 9 a distance slightly greater than the width of a correctly sized piece of work. Then the conveyor 1A is adjusted so that the inlet end 3 of the apparatus is located at the proper height for receiving work W. It will be understood that the work may be received directly from other apparatus (such as a stitching machine) or it may be fed manually or automatically from a stack of work.

Work W delivered to conveyor 1A is moved by it toward conveyor 1B and simultaneously moved to its left (the bottom side in FIGS. 1 and 2) for moving the left side of the work against the inner surface 111A of the side guide 9 on conveyor 1A. As the work is moved along conveyor 1A its upper surface is engaged by the hold-down balls 135 for holding it against the conveyor belts or tapes 45 so that it is moved along the conveyor without sliding on the belts. Should the work fail to be moved against guide 9, or if it is against guide 9 but is too wide to enter the side aligning device 11, then its presence will be sensed by the microswitch 13. When switch 13 closes, it completes a rejector circuit (similar to that shown in FIG. 18), the plate 169 of the midmachine dump mechanism 15 is elevated, and the misaligned or excessively wide work is discharged downwardly between conveyor rollers 39 and 51.

The work which passes switch 13 without closing it is delivered to conveyor 1B where it travels into the space between the C-shaped guides 195 and 215 of the side aligning device 11. When the work breaks the light beam passing between the light source 239 and the photoelectric cell 241 just in front of work station 5, the control system is actuated due to the change in the resistance of the cell 241. This change in resistance affects the photoelectric cell and multivibrator circuit shown at 511 in FIG. 16 and results in the side squaring device silicon controlled rectifier 525 being turned on. This energizes the solenoid 235 of the side squaring device and moves the C-shaped guide 215 of the side squaring device to the left as viewed in FIG. 9 toward the fixed guide 195, thereby moving the work W to the left for alignment against the inner surface 200 of guide 195. At the same time the gate solenoid 407 is energized to lower the gate 19 and place the front gate bar 379 in the path of the work behind the holes in die 331. Simultaneously current is provided through transformers 529 to the circuit 531 shown in FIG. 17 for initiating the timing circuit 541. The punch mechanism must now be operated within a predetermined time interval (determined by the timing circuit 541) or the work will be discharged through the dump mechanism 23.

Operation of the side squaring device closes the switch 289 (FIGS. 1 and 17) adjacent the side squaring solenoid 235 to complete the circuit which gates silicon controlled rectifier 547 on. This results in the end squaring solenoid 271 being energized. Solenoid 271 operates through the bell crank member 285 to swing the end kickers 277 clockwise (as viewed in FIG. 8) about the axis of shaft 275 from their solid line position to their dotted line position and into engagement with the trailing end of the work W for moving the work into the work station and against the front surface of the gate bar 379. This stops the work in the work station 5 and simultaneously properly squares the ends of the work. The work is now stopped in the work station with its sides and ends properly positioned for operation of the punch.

As the work moves against the gate it engages the head 419 (FIG. 12) of pin 417 to move it against the bias of spring 421 for closing switch 409. This switch in effect senses the presence of properly aligned work at the gate and closes the circuit to the gate 569 of the silicon controlled rectifier 563 (FIG. 15) for turning it on so that current may pass through the bridge rectifier 571. This provides current to the windings of the solenoids 451A and 467A which operate the solenoid controlled valves 451 and 467, respectively (FIG. 14), thereby closing the normally opened air valve 443 and opening the normally closed air valve 461. As a result, air under pressure is simultaneously provided to the upper end of the cylinder 431 of air motor 427 and exhausted from the lower end of the cylinder to the atmosphere through the valve 449. This downward motion is transmitted through piston rod 433 and ram 337 to the punches 335, moving them downwardly through the work which is stopped in the work station at this time.

When the ram is fully lowered, switch actuating arm 473 on the ram engages microswitch 475 to close it. Closing of switch 475 completes a circuit through the lines 575 and 577 to reset the flip-flop or multivibrator portion 521 of the photoelectric cell circuit 511 to its "off" state relative to SCR 525. Circuit 511 remains in this condition until the next piece of stock interrupts the light beam for restarting the cycle. At this time circuit 511 is not sensitive to movement of the punched piece of work out of the machine.

Resetting of circuit 511 shuts off the power supplied to the gate 523 of silicon controlled rectifier 525 which in turn shuts off the silicon controlled rectifiers 547 and 563. This simultaneously deenergizes the side squaring solenoid 235, the end squaring solenoid 271 and the gate solenoid 405. The movable guide 215 of the side squaring device 11 then returns to its original position (i.e., it moves to the right as viewed in FIG. 9), the kickers 277 move from the dotted to the solid line positions shown in FIG. 8, and the gate mechanism 19 is elevated by springs 339 to its original position out of the path of the work.

The work is then moved completely through the work station and onto conveyor 1C. Movement of work through the work station is accomplished by conveyor 1B and by the hold-down and driving roller 301 which is biased against the conveyor roller 49 at the entrance to the work station. Conveyor 1C moves the work to the outlet end 7 of the apparatus where it may be delivered to a receiver and stacked, to another conveyor for delivery of other apparatus, etc.

Should any of the described steps between the sensing of the work by the photoelectric cell and the raising of the punches following punching of the work in the work station fail to occur, or if for any other reason this cycle is not completed within a predetermined time interval (as determined by the timing circuit 541), then at the end of this predetermined time interval the relay contacts 585 (FIGS. 17 and 18) are closed to complete the circuit for the rejector circuit 593 (FIG. 18). Then two steps simultaneously occur. A signal is provided from transformer 607 to the flip-flop portion 521 of the photoelectric cell circuit changing its state so that the side squaring solenoid 235, the end squaring solenoid 271 and the solenoids 451A and 467A for valves 451 and 467 are deenergized. This results in the return of the movable guide 215 to its original position, elevation of the end kicker devices and lifting of the gate 19 by the springs 399. Simultaneously, the solenoid 605 for the dump mechanism 23 at the gate of the apparatus is energized, thereby swinging the plate 481 of this dump mechanism in a counterclockwise direction (as viewed in FIG. 10) across the path of the work W. It will be seen that these steps release the work so that it may be moved by the conveyor 1B and simultaneously prevents the work from being delivered to conveyor 1C of the apparatus. The dump mechanism 23 causes the work to be discharged downwardly between the conveyor roller 65 and the die mounting plate 327. This work may be collected and rerun through the machine. While work not acted on in the work station could be removed from the work station simply by elevating the gate and releasing the side and end squaring devices, such would result in a mixture of punched and unpunched work being delivered from the exit 7 of the apparatus. This would require either continuous monitoring of the work handled by the apparatus to prevent mixture of the punched and unpunched work or work accumulated at the end of conveyor 1C would have to be checked to eliminate any unpunched work. The dumping mechanism 23 eliminates the need for these time consuming operations.

It has been found that the apparatus of the invention is capable of moving paper and similar work at a rate of approximately 5,000 inches per minute or at a rate of about 15,000 pieces per hour. This is a substantial improvement over a prior method of punching work which required an operator to individually feed the work to the punch, such being operated at a maximum rate of about 1500 pieces per hour. The apparatus of the invention operates at about 50 millisecond per cycle and such speed is obtained in part by providing the solid state circuit shown and described which operates faster than circuits using many relays which are relatively slow acting.

Since each of the steps of the operations is initiated by sensing the presence of work at a particular location or upon completion of the previous step in the cycle, there is no need for timed operations except for the dump or rejector mechanism. This reduces the cycle time of the apparatus as compared to apparatus requiring a timing motor where time delay intervals are necessary to prevent steps in the operation from overlapping.

The apparatus may handle work substantially automatically with little or no attention required after it has been set up and started. Since the work moves in substantially a straight line or path, greater speed may be obtained than with apparatus where the work is fed to the work station and then its direction of movement reversed or changed substantially. Also, jamming of the work at various positions in the apparatus is virtually eliminated by the provision of the dump rejector mechanisms. The vertical movement of conveyor 1A at end 3 of the apparatus makes the apparatus easily adjustable for use in connection with various machinery which may feed work to it. The speed at which the apparatus operates permits it to successively receive closely spaced pieces of work without jamming the apparatus.

While the apparatus has been described in connection with performing a punching operation on paper at the work station 5, it will be understood that other operations may be performed on the work at the work station. For example, the mechanism at the work station 5 may be a device for cutting index tabs on paper sheets.

The adjustment of the gate stop bar 379 in a horizontal plate permits operations to be performed on the work at various distances from its leading edge, and the lateral adjustment of the guides 9, 181 and 215 permits adjustment of the location of the punches relative to the sides of the work.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Apparatus for aligning work and moving it to and from a work station, the apparatus comprising a conveyor system for moving work in substantially a straight line from an entrance of the apparatus to the work station and then to an exit of the apparatus, means for locating the sides of the work relative to the work station as it travels between the entrance of the apparatus and the work station, a device for engaging the trailing edge of the work and moving it into the work station, a gate at the work station mounted for movement between a first position out of the path of the work to permit advancement of the work by the conveyor system and a second position in the path of the work where it is engageable by the leading edge of the work for stopping the work at the work station, means for moving the gate between its two positions, a control system for sequentially actuating the gate moving means and the device for moving the work into the work station whereby the work is moved into the work station while the gate is in its second position to stop the work in the work station, and the gate is then moved to its first position to permit advancement of the work from the work station to the exit of the apparatus by the conveyor system, and means between the entrance of the apparatus and the means for locating the sides of the work for detecting work which is so positioned on the conveyor system that it cannot enter the means for locating the sides of the work, a dump mechanism between the means for locating the sides of the work and said detecting means for removing from the conveyor system work which is so positioned on the conveyor system that it cannot enter the means for locating the sides of the work, operation of the dump mechanism being initiated by said detecting means.

2. Apparatus as set forth in claim 1 wherein the means for locating the sides of the work comprises a stationary guide at one side of the path of travel of the work on the conveyor system, and a guide at the other side of the path of travel of the work movable toward and away from the stationary guide for moving the work transversely of its path of travel into engagement with the stationary guide, the stationary guide and the movable guide being mounted for adjustment toward and away from each other for transverse adjustment of the path of travel of work and for accommodating work of various widths.

3. Apparatus as set forth in claim 2 further comprising a second stationary guide located between the means for locating the sides of the work and the entrance of the apparatus, the second stationary guide being elongate and mounted for adjustment transversely to the path of travel of the work on the conveyor system, the length of the second stationary guide being at an angle to a portion of the conveyor system between the entrance of the apparatus and the second stationary guide whereby preliminary alignment of the side edge of the work is achieved prior to delivery of the work to the means for locating the sides of the work.

4. Apparatus as set forth in claim 2 further comprising a second stationary guide located between the stationary guide of the means for locating the sides of the work and the entrance of the apparatus, the second stationary guide being elongate and mounted for adjustment transversely relative to the path of travel of the work whereby it can be aligned with the stationary guide of the means for locating the sides of the work, and a portion of the conveyor system between the entrance of the apparatus and the second stationary guide being skewed relative to the length of the second stationary guide whereby work on the skewed portion is moved angularly toward the second stationary guide and then moved along the second stationary guide to the means for locating the sides of the work.

5. Apparatus as set forth in claim 1 wherein the conveyor system includes a first conveyor at the entrance of the apparatus, and a second conveyor for delivering work from the first conveyor to the work station, the first conveyor being skewed relative to the second conveyor.

6. Apparatus as set forth in claim 5 wherein the end of the first conveyor at the entrance of the apparatus is mounted for adjustment of its height whereby the apparatus is adapted for direct feeding of work from the exit of other apparatus of various heights.

7. Apparatus as set forth in claim 1 further comprising mechanism at the work station for performing an operation on the work, said control system being associated with said mechanism for initiating its operation after work has been delivered to the work station.

8. Apparatus for aligning work and moving it to and from a work station, the apparatus comprising a conveyor system for moving work in substantially a straight line from an entrance of the apparatus to the work station and then to an exit of the apparatus, means for locating the sides of the work relative to the work station as it travels between the entrance of the apparatus and the work station, a device for engaging the trailing edge of the work and moving it into the work station, a gate at the work station mounted for movement between a first position out of the path of the work to permit advancement of the work by the conveyor system and a second position in the path of the work where it is engageable by the leading edge of the work for stopping the work at the work station, means for moving the gate between its two positions, a control system for sequentially actuating the gate moving means and the device for moving the work into the work station whereby the work is moved into the work station while the gate is in its second position to stop the work in the work station, and the gate is then moved to its first position to permit advancement of the work from the work station to the exit of the apparatus by the conveyor system, and mechanism at the work station for performing an operation on the work, said control system being associated with said mechanism for initiating its operation after work has been delivered to the work station, and a dump mechanism between the entrance to the work station and the exit of the apparatus for removing from the apparatus work not operated upon by said mechanism at the work station, operation of the dump mechanism being regulated by the control system, and said control system further comprising a time delay device initiated in response to movement of work and operative after a predetermined time interval to operate the gate moving means for moving the gate to its first position and to initiate operation of the dump mechanism, and the control system having means responsive to operation of said mechanism at the work station within said predetermined time interval following initiation of the time delay device for preventing operation of the dump mechanism by the time delay device.

9. Apparatus as set forth in claim 7 further comprising a dump mechanism between the entrance to the work station and the exit of the apparatus for removing from the apparatus work not operated upon by said mechanism at the work station, and means for sensing the position of work on the apparatus and for selectively operating the dump mechanism in response to the position of the work on the apparatus.

10. Apparatus as set forth in claim 1 wherein the device for engaging the trailing edge of the work and moving the work into the work station comprises a plurality of pawls mounted for movement into and out of the path of travel of the work, and means regulated by the control system for effecting movement of the pawls into the path of travel of the work for engaging the trailing edge of the work and for subsequently effecting reverse movement of the pawls out of the path of travel of the work.

11. Apparatus for aligning work and moving it to a work station where an operation is performed on it and then moving it away from the work station, the apparatus comprising a conveyor system for moving work received at an entrance of the apparatus to the work station and then through the work station to an exit of the apparatus, a side aligning device between the entrance of the apparatus and the work station comprising a first guide at one side of the path of travel of the work and a second guide at the other side of the path of travel of the work, the second guide being mounted for movement toward and away from the first guide, means for moving the second guide toward the first guide as the work passes between the guides, means between the entrance of the apparatus and the side aligning device for removing work on the conveyor system that cannot enter the side aligning device, said removing means comprising means for sensing work that is misaligned on the conveyor system and means for deflecting the misaligned work from the normal path of travel of the work on the conveyor system, a device for engaging the trailing edge of the work and moving the work into the work station comprising a plurality of pawls mounted for swinging movement into and out of the path of travel of the work and means for simultaneously moving the pawls, a gate at the work station mounted for movement between a first position out of the path of the work to permit advancement of the work by the conveyor system and a second position in the path of the work where it is engageable by the leading edge of the work for stopping the work at the work station, means for moving the gate between its two positions, and a control system for sequentially actuating first the gate moving means and the side aligning device, then the device for shoving the work into the work station, and then the gate moving means whereby the gate is moved to its second position and the second guide is moved toward the first guide for aligning the sides of the work on the conveyor system, then the work is moved into the work station by the pawls while the gate is in its second position to stop the work in the work station for performing operation on the work, and then the gate is moved to its first position to permit advancement of the work from the work station to the exit of the apparatus by the conveyor system.

12. Apparatus as set forth in claim 11 wherein said conveyor system comprises a first conveyor having an end at the entrance of the apparatus, a second conveyor for receiving work from the first conveyor and moving it to the work station, and a third conveyor for receiving work from the work station and moving it to the exit of the apparatus, the end of the first conveyor at the entrance of the apparatus being adjustable to a plurality of positions between a lowered position and an elevated position for receiving work at various heights, the second and third conveyors being positioned relative to each other so that the path of travel of work on the second conveyor is substantially in line with the path of travel of work on the third conveyor, and the first conveyor being positioned relative to the second conveyor so that the path of travel of the work on the first conveyor is skewed at a small angle relative to the path of travel of the work on the second conveyor.

13. Apparatus as set forth in claim 12 further comprising a side guide along the first conveyor substantially in line with said first guide on the side aligning device and skewed at a small angle relative to the path of travel of the work on the first conveyor, means for adjusting the position of the side guide on the first conveyor, and means on the first conveyor for engaging and holding down work being moved along the first conveyor.

14. Apparatus as set forth in claim 11 further comprising a dump mechanism at the outlet of the work station adjacent the gate for removing from the apparatus work not operated on in the work station, said dump mechanism comprising a pivotally mounted plate normally positioned beneath the plane of the work as it leaves the work station and means for pivoting the plate on its mounting for moving a portion of the plate into the path of travel of work leaving the work station whereby the work is deflected by the plate out of the normal path of travel of the work on the apparatus, and the control system comprising means responsive to delivery of work to the work station for initiating operation of the means for pivoting the plate.

15. Apparatus as set forth in claim 14 wherein the means of the control system for initiating operation of the pivoting means includes a time delay circuit having a time delay relay, means for sensing delivery of work to the work station and initiating operation of the time delay relay, means responsive to operation on the work in the work station for interrupting the time delay circuit, and the means for pivoting the plate of the dump mechanism including a solenoid energized by said time delay circuit, the solenoid having a core linked to said plate for pivoting the plate on retraction and extension of the core whereby the time delay circuit after a predetermined time interval without interruption will energize said solenoid to pivot said plate of the dump mechanism for removing the work from the apparatus.

16. Apparatus as set forth in claim 15 wherein the means for removing work on the conveyor system that cannot enter the side aligning device comprises a second dump mechanism between the side aligning device and the entrance of the apparatus, said second dump mechanism comprising a plate pivotally mounted for movement from a position beneath the path of travel of the work on the conveyor system into a position across the path of travel of the work on the conveyor system, a solenoid in said control system having a core linked to the plate of the second dump mechanism for pivoting the plate upon extension and retraction of the core, and the control system including a switch for regulating operation of the solenoid of the second dump mechanism, the switch being located at one side of the path of travel that must be taken by the work as it moves along the conveyor in order for the work to properly enter the side aligning device.

17. Apparatus as set forth in claim 11 wherein the movable guide of the side aligning device and the pawls of the device for moving the work into the work station are moved by separate solenoids comprising part of said control system, the control system further comprising a sensor for detecting delivery of work to the side aligning device, the sensor being connected in a circuit for energizing the solenoid controlling movement of said movable guide, and the solenoid for moving said pawls being energized in response to movement of the movable guide of the side aligning device, and the solenoids for the side aligning device and said pawls being deenergized in response to performing an operation on the work in the work station.

18. Apparatus as set forth in claim 17 further comprising a gate solenoid in the control system, the gate solenoid having a retractable core linked to said gate whereby energization of the gate solenoid to retract its core moves the gate to its second position in the path of travel of the work, and the control system having a time delay circuit for deenergizing the gate solenoid after a predetermined time interval after the gate is first moved to its second position to permit passage of work from the work station beneath the gate.

19. Apparatus as set forth in claim 11 wherein the forward edge of said gate is adjustable along the path of travel of the work through the work station whereby the work can be stopped at the work station with its leading edge in various positions.

20. Apparatus for aligning work, moving it to a work station, performing work on it at the work station, and then conveying it from the work station, the apparatus comprising a conveyor system for moving work from an entrance of the apparatus to the work station and then to the exit of the apparatus, a device for aligning the sides of the work for delivery to the work station as it travels between the entrance of the apparatus and the work station, a device for engaging the trailing edge of the work and moving the work into the work station, mechanism at the work station for performing an operation on the work, means for detecting the presence of work as it approaches the entrance of the work station, a gate at the work station mounted for movement between a first elevated position out of the path of the work to permit advancement of the work by the conveyor system and a second lowered position in the path of the work where it is engageable by the leading edge of the work for stopping the work at the work station, means for moving the gate between its two positions, a normally open switch at the work station adapted to be closed when work is moved against the gate, the switch upon closing initiating operation of the mechanism at the work station, a dump mechanism between the entrance of the work station and the exit of the apparatus for removing from the apparatus work not operated upon in the work station, and a control system for first operating the gate moving means for lowering the gate and for actuating the side aligning device in response to detecting the presence of the work as it approaches the work station, then actuating the device for moving the work into the work station in response to operation of the side aligning device with the work closing the switch at the gate and initiating operation of the mechanism at the work station for performing an operation on the work, and then operating the gate moving means for raising the gate in response to operation of the mechanism at the work station for performing an operation on the work thereby to permit advancement of the work from the work station to the exit of the apparatus by the conveyor system.

21. Apparatus as set forth in claim 20 wherein the side aligning device is operated by a solenoid energized by a circuit of the control system which is closed in response to detecting of work as it approaches the work station, said gate is moved from its elevated position to its lowered position by a second solenoid energized by said circuit, the device for moving work into the work station is operated by a third solenoid energized by a circuit of the control system which is closed in response to operation of the side aligning device by the first solenoid, said second solenoid being deenergized by opening of its associated circuit in the control system in response to the mechanism at the work station performing an operation on the work, thereby permitting raising of the gate to its elevated position, and the dump mechanism comprises a plate movable between a first position beneath the path of travel of the work as it leaves the work station and a second position across the path of travel of the work, and a fourth solenoid for moving said plate of the dump mechanism between its two positions, said fourth solenoid being energized by a timing circuit of the control system first closed in response to the detecting device sensing work approaching the work station and with said circuit including a time delay device for energizing said fourth solenoid and opening the circuit to said second solenoid, after a predetermined time interval, said timing circuit being interrupted on operation of said mechanism at the work station whereby said dump plate is moved to its second position across the path of travel of the work only on failure of the mechanism at the work station to perform an operation on the work within a predetermined time interval following delivery of work to the work station.

22. Apparatus as set forth in claim 20 wherein the mechanism at the work station comprises a punch movable in a vertical plane between an elevated position above work at the work station and a lowered position where the work is penetrated by the punch, and a die beneath the plane of work in the work station, the die having an opening for accommodating the punch in its lowered position.

23. Apparatus as set forth in claim 22 wherein the punch is movable between its two positions by an air motor comprising an elongate air cylinder, a piston movable between upper and lower end portions of the cylinder, and a piston rod connecting said piston and said punch and projecting through the lower end of the cylinder, and means regulated by said control system for supplying air under pressure to said air motor for lowering the punch when work is properly aligned between the punch and the die and for raising the punch after it has penetrated the work so that the work can be removed from the work station.

24. Apparatus as set forth in claim 23 wherein the means for supplying air to the air motor comprises a first air tank adapted to contain air under pressure, means for supplying air under pressure to the tank at a regulated pressure, a first solenoid operated air valve operated by said control system for controlling delivery of air from the first air tank to the upper end portion of the air cylinder, thereby lowering the piston in the cylinder, means for venting said upper end portion of the cylinder to the atmosphere when air is being delivered to the lower end of the cylinder, a second air tank adapted to contain air under pressure, means for supplying air under pressure to the second tank at a regulated pressure, a second solenoid operated air valve operated by the control system for controlling delivery of air from the second air tank to the lower end portion of the cylinder, thereby raising the piston in the cylinder, and means for venting the lower end portion of the cylinder to the atmosphere when air is being delivered to the upper end portion of the air cylinder.

25. Apparatus for punching paper stock or other work at a work station comprising:
- a conveyor system for moving the work from the entrance of the apparatus to the work station, through the work station and away from the work station to the exit of the apparatus in substantially a straight line;
- a side aligning device between the entrance of the apparatus and the work station, said side aligning device including a side guide movable by operation of a solenoid;
- an end squaring device between the entrance of the apparatus and the work station comprising a plurality of kickers movable from an elevated position above the path of travel of the work into a lowered position in the path of travel of the work for engaging the trailing end of the work and moving it into the work station, said kickers being moved to their lowered position by operation of a solenoid;
- punch mechanism at the work station comprising a die positioned beneath the path of travel of the work and a plurality of punches movable between a first position above the work and a second position where they are received in the die, said punches being moved between the first and second positions by solenoids controlling an air motor;
- a gate mechanism movable from an elevated position above the path of travel of the work to a lowered position across the path of travel of the work behind the work station for stopping the leading edge of the work while a portion of the work is in the work station, said gate mechanism being movable from its elevated to its lowered position by a solenoid, and spring means for returning the gate mechanism from its lowered to its elevated position; and
- a control system for operation of said side aligning device, said gate, said end squaring device, and said air motor for said punch, said control system comprising a sensor for detecting the presence of work at the side aligning device as it approaches the work station, and a circuit completed in response to said sensor detecting the presence of the work for providing current to said solenoid for operating said side aligning device, said circuit further including said solenoid of said gate mechanism whereby said gate mechanism is moved to its lowered position simultaneous with operation of said side aligning device, said control system further comprising a circuit for said solenoid of said end squaring device including a switch, said switch being closed to operate said end squaring solenoid upon completion of operation of said side squaring device, said control system further comprising a punch operating circuit including said solenoids for said air motor and a switch positioned at said gate mechanism and adapted to be closed by movement of work against said gate by said end squaring device, said control further comprising a circuit including a switch adapted to be closed when said punch is lowered with said circuit when completed being operable to open the circuits to said side squaring solenoid, said end squaring solenoid, said gate mechanism and said solenoids for said air system whereby said side squaring device is moved to its open position, thereby opening the circuit to said side squaring device and simultaneously said gate solenoid is deenergized for movement of the gate mechanism to its elevated position, thereby permitting work to pass through said work station and be discharged from the exit of said apparatus by said conveyor system.

References Cited
UNITED STATES PATENTS

| | | | |
|---|---|---|---|
| 1,547,642 | 7/1925 | Casal | 83—276 X |
| 1,620,444 | 3/1927 | Davidson. | |
| 2,196,684 | 4/1940 | Rodder et al. | 83—262 X |
| 3,004,456 | 10/1961 | Moser | 83—268 X |
| 3,146,650 | 9/1964 | Sarring et al. | 83—91 |
| 3,225,635 | 12/1965 | Brandt et al. | |
| 2,731,086 | 1/1956 | Easton. | |

ANDREW R. JUHASZ, *Primary Examiner.*